(12) United States Patent
Akiyama et al.

(10) Patent No.: US 7,523,011 B2
(45) Date of Patent: Apr. 21, 2009

(54) METHOD FOR ANALYZING SIGNAL WAVEFORM AND ANALYZING VEHICLE DYNAMIC CHARACTERISTIC

(75) Inventors: Takao Akiyama, Tokyo (JP); Masahiko Suzuki, Shizuoka (JP); Tatsuya Sagiyama, Aichi (JP); Teruo Yoshida, Shizuoka (JP); Yoichi Funahashi, Aichi (JP)

(73) Assignees: Meidensha Corporation, Tokyo (JP); Toyota Jidosha Kabushiki Kaisha, Aichi (JP)

( * ) Notice: Subject to any disclaimer, the term of this patent is extended or adjusted under 35 U.S.C. 154(b) by 85 days.

(21) Appl. No.: 11/526,991

(22) Filed: Sep. 26, 2006

(65) Prior Publication Data

US 2007/0071327 A1    Mar. 29, 2007

(30) Foreign Application Priority Data

Sep. 27, 2005    (JP)    ............................. 2005-279033

(51) Int. Cl.
*G06K 9/00*    (2006.01)

(52) U.S. Cl. ..................... 702/141; 702/66; 702/119; 702/190

(58) Field of Classification Search ................. 702/141, 702/119, 66, 190, 191, 189
See application file for complete search history.

(56) References Cited

U.S. PATENT DOCUMENTS

| 6,208,951 B1* | 3/2001 | Kumar et al. ................ 702/191 |
| 2007/0003941 A1* | 1/2007 | Olson et al. .................... 435/6 |

FOREIGN PATENT DOCUMENTS

JP    2579646    11/1996

* cited by examiner

*Primary Examiner*—Drew A Dunn
*Assistant Examiner*—Hien X Vo
(74) *Attorney, Agent, or Firm*—Bachman & LaPointe, P.C.

(57) ABSTRACT

A signal waveform analysis method includes: determining a trend component of an object signal by applying a zero-phase filter to the object signal; determining an oscillatory component of the object signal by removing the trend component from the object signal; determining a wavelet scalogram by performing a wavelet analysis on the oscillatory component; and determining an oscillation period of the object signal with which the wavelet scalogram indicates a maximum. The signal waveform analysis method is employed to evaluate vehicle dynamic characteristics.

24 Claims, 20 Drawing Sheets

FIG.1

ALGORITHM IN FIRST EMBODIMENT

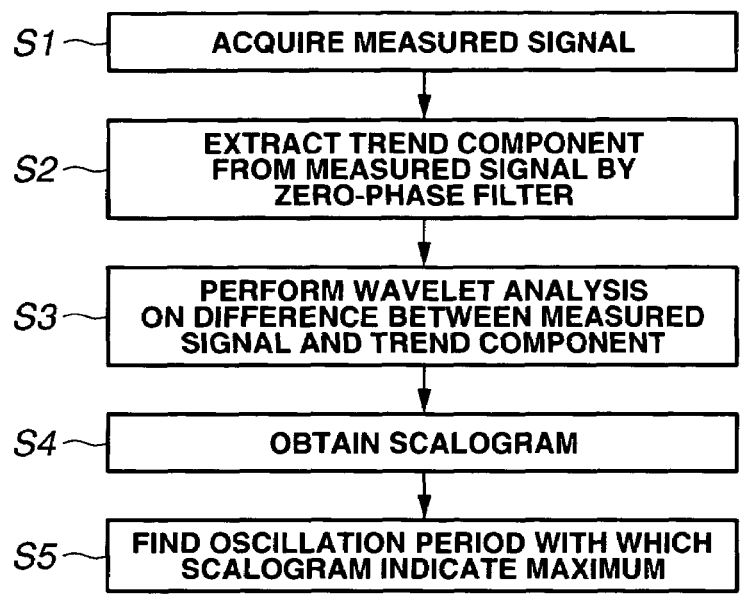

- S1 — ACQUIRE MEASURED SIGNAL
- S2 — EXTRACT TREND COMPONENT FROM MEASURED SIGNAL BY ZERO-PHASE FILTER
- S3 — PERFORM WAVELET ANALYSIS ON DIFFERENCE BETWEEN MEASURED SIGNAL AND TREND COMPONENT
- S4 — OBTAIN SCALOGRAM
- S5 — FIND OSCILLATION PERIOD WITH WHICH SCALOGRAM INDICATE MAXIMUM

FIG.2

MEASURED SIGNAL UNDER WAVELET ANALYSIS

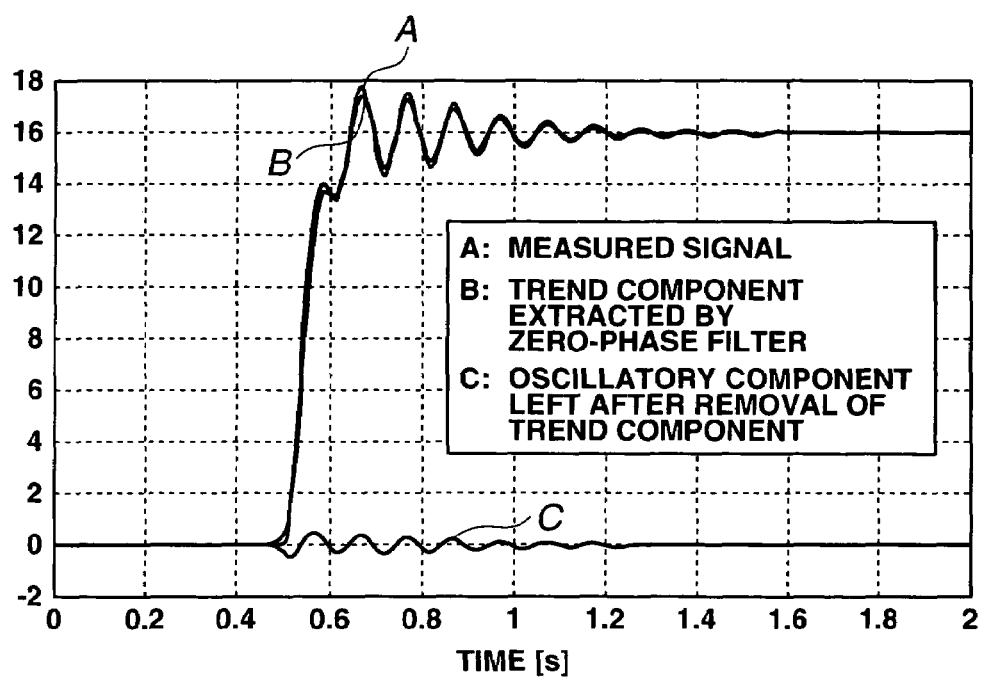

A: MEASURED SIGNAL
B: TREND COMPONENT EXTRACTED BY ZERO-PHASE FILTER
C: OSCILLATORY COMPONENT LEFT AFTER REMOVAL OF TREND COMPONENT

TIME [s]

ALGORITHM IN THIRD EMBODIMENT

ALGORITHM IN FOURTH EMBODIMENT

FIND MAXIMUM AND MINIMUM

ALGORITHM IN ELEVENTH EMBODIMENT

- S1 — ACQUIRE MEASURED SIGNAL
- S10 — PERFORM WAVEFORM ANALYSIS
- S11 — OBTAIN SCALOGRAM
- S11c — FIND SCALE PARAMETER WITH WHICH SCALOGRAM INDICATE MAXIMUM AT TRIGGER TIME
- S17 — FIND AVERAGE OF OBJECT SIGNAL WITHIN PERIOD OF DOMINANT FREQUENCY COMPONENT BEFORE TRIGGER TIME

FIND AVERAGE OF OBJECT SIGNAL

FIND AVERAGE OF OBJECT SIGNAL

ALGORITHM IN TWELFTH EMBODIMENT

FIND AVERAGE OF
OBJECT SIGNAL BEFORE CHANGE

FIND AVERAGE OF
OBJECT SIGNAL BEFORE CHANGE

WAVEFORM OF MEASURED SIGNAL

WAVEFORM OF MEASURED SIGNAL

FOURIER ANALYSIS

WAVELET ANALYSIS

METHOD FOR ANALYZING SIGNAL WAVEFORM AND ANALYZING VEHICLE DYNAMIC CHARACTERISTIC

BACKGROUND OF THE INVENTION

The present invention relates to a method for analyzing a signal waveform containing an oscillatory component and an aperiodic component, a computer program implementing the signal waveform analysis method, a method for analyzing vehicle dynamic characteristics with the signal waveform analysis method, and a computer program implementing the vehicle dynamic characteristic analysis method.

Conventionally, there is a method of analyzing the period of an oscillatory component of such a measured signal as indicative of an acceleration of a machine at acceleration or deceleration when the measured signal contains an oscillatory component and an aperiodic component (or henceforth referred to as "trend component"). One such analysis method includes removing the average or linear regression component of the whole measured signal from the measured signal and performing a Fourier analysis on the processed signal, while another such analysis method includes performing a wavelet analysis directly on the measured signal. FIG. 27 shows an example of signals containing an oscillatory component and a trend component, which is, for example, a vehicle acceleration at acceleration. Such a vehicle acceleration affects vehicle driveability. In order to evaluate such a vehicle acceleration, a signal waveform analysis is performed.

Such a method of analyzing vehicle driveability is disclosed in Japanese Patent No. 2579646 (henceforth referred to as JP2579646). The method disclosed in JP2579646 comprises: finding peaks of oscillation of a vehicle acceleration detected by acceleration detecting means; determining a change from the middle of the range of the oscillation before acceleration to the middle of the range of the oscillation after acceleration; determining the ratio of the amplitude of the oscillation at each peak after acceleration to the determined change of the meddle of the oscillation; and determining a variation of the determined ratio with respect to its regression line as an evaluation value for vehicle drivability.

SUMMARY OF THE INVENTION

When a Fourier analysis is performed on a signal containing an oscillatory component and a trend component as shown in FIG. 27, it is difficult to extract accurately the frequency of the oscillatory component of the signal under the influence of the trend component of the signal in many cases. On the other hand, when a wavelet analysis is performed on such a signal, it is difficult to extract an oscillatory component of the signal from a resulting wavelet scalogram under the influence of low frequency components contained in the trend component. FIG. 28 shows an example of measured signals containing a step-like trend component and an oscillatory component, where the vertical axis indicates the magnitude of the measured signal and the horizontal axis indicates the time. FIG. 29 shows a result produced by performing a Fourier analysis after removing a linear regression of the trend component from the measured signal. In FIG. 28, the signal oscillates at an oscillation period of about 0.1 second (or 10 Hz) in the time range from about 0.6 to 1.0 second. Although it is desired to analyze this oscillation from generation to convergence, the result of the Fourier analysis in FIG. 29 shows that the 1 Hz component is the most intensive and the 10 Hz component at the time of about 0.6 to 1.0 second is relatively less intensive. FIG. 30 shows a result produced by performing a wavelet analysis after removing a linear regression of the trend component from the signal FIG. 28, where the vertical axis indicates the period of frequency components of the signal and the horizontal axis indicates the same time as in FIG. 28. In FIG. 30, the intensity of each frequency component at each time is represented by a colored point, where a blue point represents the least intensive and a red point represents the most intensive. Specifically in the result of the wavelet analysis of FIG. 30, a point of an oscillation period of 0.2 second (or 5 Hz) at a time of 0.5 second indicates the most intensive frequency component. As a result, it is difficult to detect correctly the 10 Hz component shown in FIG. 29 with the above method.

In order to evaluate vehicle driveability based on a detected vehicle acceleration, it is desired to detect correctly frequency components near 10 Hz. However, as mentioned above, it is difficult to detect them with conventional analysis methods. Accordingly, conventionally, an operator virtually finds extremums (upper and lower peaks) of signal oscillation, determines the oscillation period by measuring intervals between the extremums, and determines the oscillatory amplitudes by measuring changes in the signal between the extremums. Since such a process is performed not automatically but manually by an operator, there is a problem that the standard of evaluation is not fixed and that it takes much time to calculate various characteristic values on vehicle driveability. JP2579646 discloses performing the above analysis process by means of calculating means comprising a computer, but discloses no art of detecting correctly the above-mentioned frequency components near 10 Hz.

Accordingly, it is an object of the present invention to provide a signal waveform analysis method for detecting an oscillatory component with sufficient accuracy from a signal containing an oscillatory component and a trend component, to provide a vehicle dynamic characteristic analysis method using the signal waveform analysis method, and to provide a computer program implementing each analysis method.

According to one aspect of the present invention, a signal waveform analysis method comprises: determining a trend component of an object signal by applying a zero-phase filter to the object signal; determining an oscillatory component of the object signal by removing the trend component from the object signal; determining a wavelet scalogram by performing a wavelet analysis on the oscillatory component; and determining an oscillation period of the object signal with which the wavelet scalogram indicates a maximum.

According to another aspect of the invention, a signal waveform analysis method comprises: determining a trend component of an object signal by approximating the object signal with an exponential function expression; determining an oscillatory component of the object signal by removing the trend component from the object signal; determining a wavelet scalogram by performing a wavelet analysis on the oscillatory component; and determining an oscillation period of the object signal with which the wavelet scalogram indicates a maximum. The determining an oscillation period of the object signal may be implemented by determining an oscillation period of the object signal for each time with which the wavelet scalogram indicates a maximum at the each time.

According to a further aspect of the invention, a computer readable medium storing a signal waveform analysis computer program comprises: computer program code for determining a trend component of an object signal; computer program code for determining an oscillatory component of the object signal by removing the trend component from the object signal; computer program code for determining a wavelet scalogram by performing a wavelet analysis on the oscillatory component; and computer program code for determining an oscillation period of the object signal with which the wavelet scalogram indicates a maximum. The computer program code for determining a trend component of an object signal may be implemented by one of computer program code for applying a zero-phase filter to the object signal and computer program code for approximating the object signal with an exponential function expression. The computer program code for determining an oscillation period of the object signal may be implemented by computer program code for determining an oscillation period of the object signal for each time with which the wavelet scalogram indicates a maximum at the each time.

According to a still further aspect of the invention, a vehicle dynamic characteristic analysis method comprises: determining a trend component of an object signal; determining an oscillatory component of the object signal by removing the trend component from the object signal; determining a wavelet scalogram by performing a wavelet analysis on the oscillatory component; determining a dominant oscillation period as a scale parameter for each time with which the wavelet scalogram indicates a maximum at the each time; determining in accordance with the dominant oscillation period a time when the object signal is maximum; and determining a maximum and a minimum of the object signal within the dominant oscillation period. The determining a trend component of an object signal may be implemented by one of applying a zero-phase filter to the object signal and approximating the object signal with an exponential function expression. The vehicle dynamic characteristic analysis method may further comprise applying a zero-phase filter to the object signal before the determining a trend component of an object signal. The determining a dominant oscillation period may be implemented by determining a dominant oscillation period as a scale parameter for each time with which the wavelet scalogram indicates a maximum at the each time with a band limitation on scale parameter, and the determining a maximum and a minimum of the object signal may comprise: determining a complex signal waveform by performing a wavelet inverse transformation of the wavelet scalogram; extracting a real part from the complex signal waveform; and determining a maximum and a minimum of the object signal within the dominant oscillation period in accordance with the real part.

According to another aspect of the invention, a vehicle dynamic characteristic analysis method comprises: determining a trend component of an object signal; determining an oscillatory component of the object signal by removing the trend component from the object signal; determining a wavelet scalogram by performing a wavelet analysis on the oscillatory component with a band limitation on scale parameter; determining a complex signal waveform by performing a wavelet inverse transformation of the wavelet scalogram; and obtaining a signal waveform envelope by determining the absolute value of the complex signal waveform.

According to another aspect of the invention, a vehicle dynamic characteristic analysis method comprises: determining a trend component of an object signal; determining an oscillatory component of the object signal by removing the trend component from the object signal; determining a wavelet scalogram by performing a wavelet analysis on the oscillatory component; processing the wavelet scalogram with a filter having a frequency-gain characteristic at each time; determining a complex signal waveform by performing a wavelet inverse transformation of the wavelet scalogram; and obtaining the magnitude of a component emphasized by the filter by determining the absolute value of the complex signal waveform. The vehicle dynamic characteristic analysis method may further comprise determining a signal waveform of the emphasized component by extracting a real part from the complex signal waveform.

According to another aspect of the invention, a vehicle dynamic characteristic analysis method comprises: determining a trend component of an object signal; determining an oscillatory component of the object signal by removing the trend component from the object signal; determining a wavelet scalogram by performing a wavelet analysis on the oscillatory component; determining a dominant oscillation period of the object signal at a trigger time; determining an average of the object signal in accordance with the dominant oscillation period at the trigger time. The determining an average of the object signal may comprise: determining a first average and a standard deviation of the object signal in accordance with the dominant oscillation period at the trigger time; and determining a second average of the object signal before change in accordance with the first average and the standard deviation.

According to another aspect of the invention, a computer readable medium stores a vehicle dynamic characteristic analysis computer program comprising: computer program code for determining a trend component of an object signal; computer program code for determining an oscillatory component of the object signal by removing the trend component from the object signal; computer program code for determining a wavelet scalogram by performing a wavelet analysis on the oscillatory component; computer program code for determining a dominant oscillation period as a scale parameter for each time with which the wavelet scalogram indicates a maximum at the each time; computer program code for determining in accordance with the dominant oscillation period a time when the object signal is maximum; and computer program code for determining a maximum and a minimum of the object signal within the dominant oscillation period. The computer program code for determining a trend component of an object signal may be implemented by one of computer program code for applying a zero-phase filter to the object signal and computer program code for approximating the object signal with an exponential function expression. The vehicle dynamic characteristic analysis computer program may further comprise computer program code for applying a zero-phase filter to the object signal before the determining a trend component of an object signal. The computer program code for determining a dominant oscillation period may be implemented by computer program code for determining a dominant oscillation period as a scale parameter for each time with which the wavelet scalogram indicates a maximum at the each time with a band limitation on scale parameter, and the computer program code for determining a maximum and a minimum of the object signal may comprise: computer program code for determining a complex signal waveform by performing a wavelet inverse transformation of the wavelet scalogram; computer program code for extracting a real part from the complex signal waveform; and computer program code for determining a maximum and a minimum of the object signal within the dominant oscillation period in accordance with the real part.

According to another aspect of the invention, a computer readable medium stores a vehicle dynamic characteristic analysis computer program comprising: computer program code for determining a trend component of an object signal; computer program code for determining an oscillatory component of the object signal by removing the trend component from the object signal; computer program code for determining a wavelet scalogram by performing a wavelet analysis on the oscillatory component with a band limitation on scale parameter; computer program code for determining a complex signal waveform by performing a wavelet inverse transformation of the wavelet scalogram; and computer program code for obtaining a signal waveform envelope by determining the absolute value of the complex signal waveform.

According to another aspect of the invention, a computer readable medium stores a vehicle dynamic characteristic analysis computer program comprising: computer program code for determining a trend component of an object signal; computer program code for determining an oscillatory component of the object signal by removing the trend component from the object signal; computer program code for determining a wavelet scalogram by performing a wavelet analysis on the oscillatory component; computer program code for processing the wavelet scalogram with a filter having a frequency-gain characteristic at each time; computer program code for determining a complex signal waveform by performing a wavelet inverse transformation of the wavelet scalogram; and computer program code for obtaining the magnitude of a component emphasized by the filter by determining the absolute value of the complex signal waveform.

According to another aspect of the invention, a computer readable medium stores a vehicle dynamic characteristic analysis computer program comprising: computer program code for determining a trend component of an object signal; computer program code for determining an oscillatory component of the object signal by removing the trend component from the object signal; computer program code for determining a wavelet scalogram by performing a wavelet analysis on the oscillatory component; computer program code for processing the wavelet scalogram with a filter having a frequency-gain characteristic at each time; computer program code for determining a complex signal waveform by performing a wavelet inverse transformation of the wavelet scalogram; and computer program code for determining a signal waveform of the emphasized component by extracting a real part from the complex signal waveform.

According to another aspect of the invention, a computer readable medium stores a vehicle dynamic characteristic analysis computer program comprising: computer program code for determining a trend component of an object signal; computer program code for determining an oscillatory component of the object signal by removing the trend component from the object signal; computer program code for determining a wavelet scalogram by performing a wavelet analysis on the oscillatory component; computer program code for determining a dominant oscillation period of the object signal at a trigger time; computer program code for determining an average of the object signal in accordance with the dominant oscillation period at the trigger time. The computer program code for determining an average of the object signal may comprise: computer program code for determining a first average and a standard deviation of the object signal in accordance with the dominant oscillation period at the trigger time; and computer program code for determining a second average of the object signal before change in accordance with the first average and the standard deviation.

BRIEF DESCRIPTION OF THE DRAWINGS

FIG. 1 is a flow chart showing an algorithm in accordance with a first embodiment of the present invention.

FIG. 2 is a graph showing a measured signal under a wavelet analysis in the first embodiment.

FIGS. 5A and 5B are graphs showing measured signals under a wavelet analysis in the second embodiment, in which FIG. 5A shows a case where acceleration rises through one step, and FIG. 5B shows a case where acceleration rises through two steps.

DETAILED DESCRIPTION OF THE INVENTION

In accompanying embodiments of the present invention, an oscillatory component of a measured signal (analysis-object signal) is accurately extracted by performing a wavelet analysis on the measured signal. As described below, such a process includes performing various kinds of preprocessing and postprocessing in order to extract an oscillatory component as desired, and to evaluate vehicle driveability. The measured signal may be acquired from a test vehicle and analyzed directly on line by an analysis system comprising a computer mounted on a dynamometer system. Alternatively, the measured signal may be recorded beforehand and analyzed with an off-line analysis system.

First Embodiment

FIG. 1 is a flow chart showing an algorithm in accordance with a first embodiment of the present invention. As shown in FIG. 1, the algorithm comprises Steps S1 to S5 to be executed in sequence. Step S1 is to acquire and record a measured signal on a piece of recording media, such as a data recorder. Step S2 is to extract a trend component from the measured signal using a zero-phase filter. The zero-phase filter serves to extract a trend component without phase delay. Step S3 is to extract an oscillatory component from the measured signal, that is, to determine the difference between the trend component and the measured signal, and to perform a wavelet analysis on this oscillatory component. Step S4 is to obtain a wavelet scalogram of the oscillatory component of the measured signal. Step S5 is to find an oscillation period with which the wavelet scalogram indicates a global maximum.

FIG. 2 shows how a trend component is extracted from a measured signal at Step S2. In FIG. 2, a solid line A represents such a measured signal as generated during an upshift of a manual transmission vehicle. A dotted line B represents a trend component extracted by the zero-phase filter, while a solid line C represents an oscillatory component produced by removal of the trend component. As shown in FIG. 2, the oscillatory component is present in the time range of 0.6 to 1.0 second. Although such a rising signal waveform as indicative of acceleration of a manual transmission vehicle at an upshift as shown in FIG. 2 is analyzed in this embodiment, such a falling signal waveform as indicative of deceleration at a downshift may be analyzed in the same manner.

Figure 3:
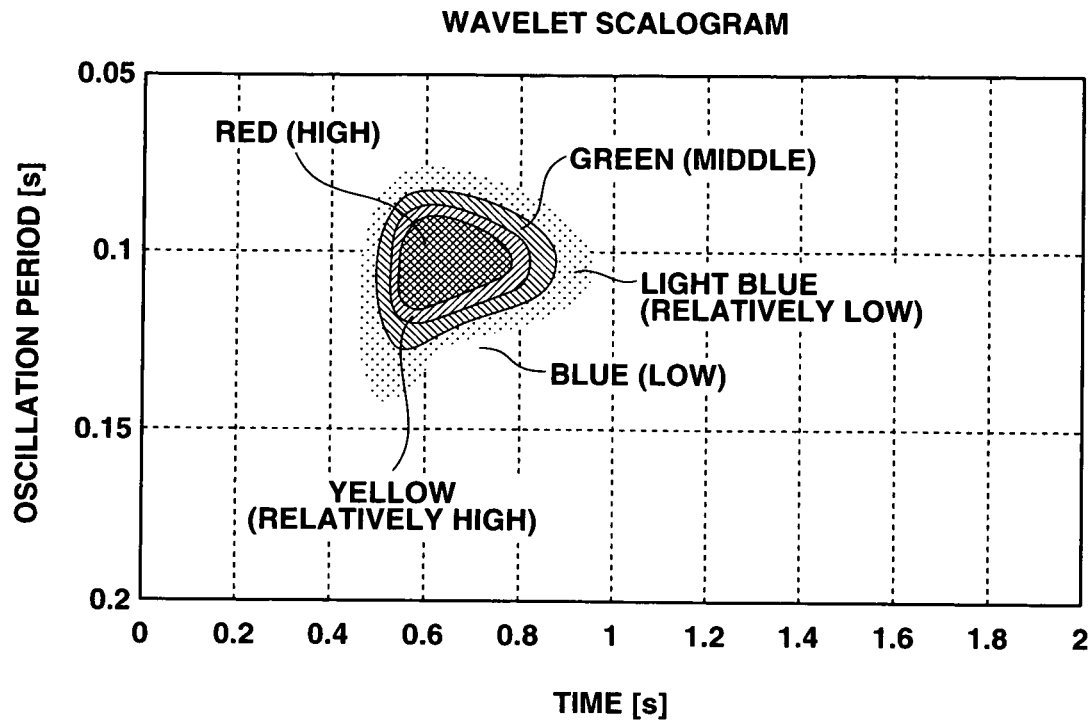
FIG. 3 is a graph showing a wavelet scalogram generated by the wavelet analysis in the first embodiment.

FIG. 3 shows a wavelet scalogram generated by performing the wavelet analysis on the oscillatory component extracted by removal of the trend component as shown by the line C in FIG. 2. In a wavelet scalogram, a red region represents the most intensive oscillation. The wavelet scalogram of FIG. 2 shows that a frequency component having an oscillation period of about 0.1 s is the most intensive in the time range from 0.6 s to 0.8 s. Thus, the analysis method of this embodiment successfully serves to extract only a desired oscillatory component.

Accordingly, the analysis method of this embodiment serves to extract only an oscillatory component from a measured signal removing the influence of a low-frequency component. With this method, it is possible to analyze accurately an oscillatory signal waveform indicative of acceleration at acceleration or deceleration of a manual transmission vehicle, and to evaluate suitably the driveability of the vehicle.

Second Embodiment

Figure 4:
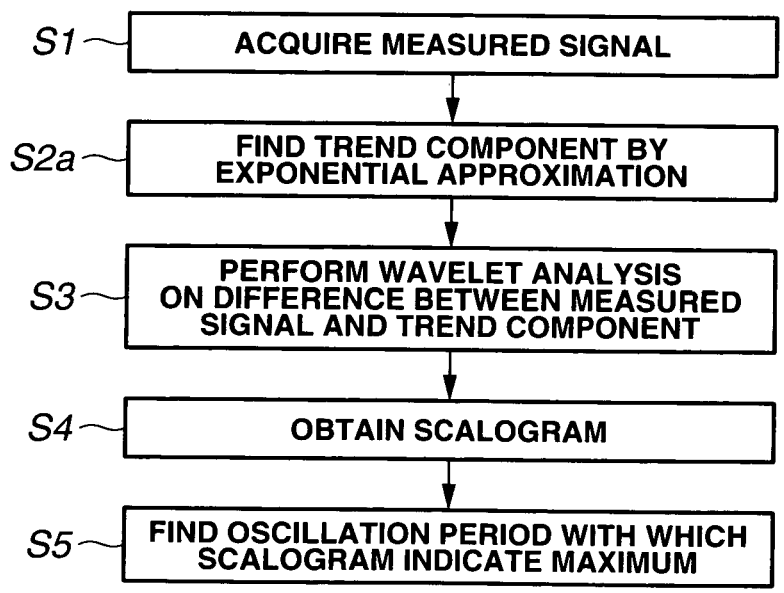
FIG. 4 is a flow chart showing an algorithm in accordance with a second embodiment of the present invention.
Figure 5A:
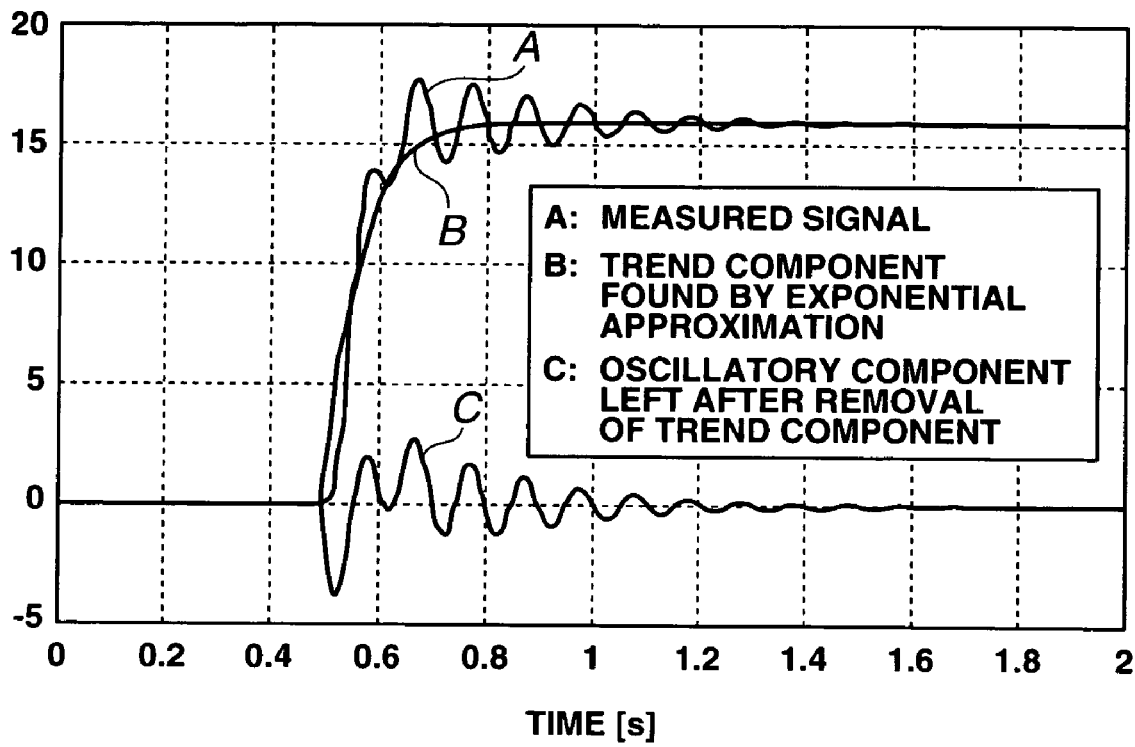
Figure 5B:
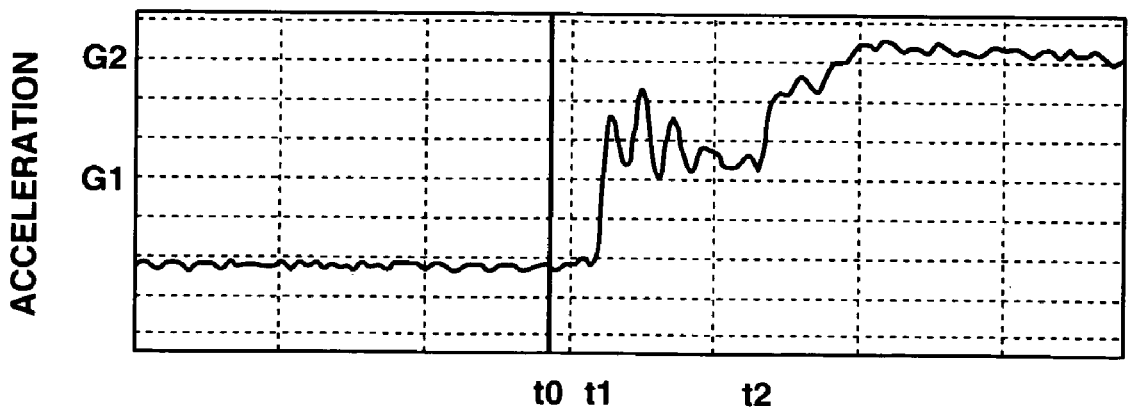

FIG. 4 is a flow chart showing an algorithm in accordance with a second embodiment of the present invention. As shown in FIG. 4, the algorithm comprises Steps S1 to S5 to be executed in sequence. The analysis method of the second embodiment differs from that of the first embodiment in that Step S2a is provided to find a trend component by exponential approximation. In the case of an automatic transmission vehicle, a shift operation of the automatic transmission may generate an acceleration signal waveform as shown in FIG. 5B. In FIG. 5B, when an accelerator opening signal occurs at time t0, the acceleration signal rises at time t1 with a certain delay, fluctuates around a value G1 after time t1, and rises toward a value G2 at time t2. In such a case, if a measured signal is applied with a zero-phase filter as in the first embodiment, the inclination of a rise of the measured signal is reduced so that it is difficult to extract accurately an oscillatory component of the measured signal. The second embodiment shows a suitable analysis method for a measured signal waveform such as the acceleration of an automatic transmission vehicle. In FIG. 4, Step S2a is to find a trend component by approximating the measured signal recorded at Step S1 with an exponential function expression. Step S3 is to extract the oscillatory component from the measured signal, that is, the difference between the trend component and the measured signal, and performs a wavelet analysis on this oscillatory component. Step S4 is to obtain a wavelet scalogram of the oscillatory component of the measured signal. Step S5 is to find an oscillation period with which the wavelet scalogram indicates a global maximum. In the exponential approximation of Step S2a, a formula of $a(1-e^{-bt})$ is determined to approximate the measured signal, where parameter a indicates a difference in the trend component of line A or B between the signal value before change and the signal value after response convergence as shown in FIG. 5A, and parameter b is found by varying at arbitrarily steps within a range such as from 0.1 to 20. Specifically, an approximate exponential function is found by varying the damping coefficient of a candidate exponential function within a predetermined range, determining the difference between the exponential function and the measured signal, and minimizing the sum of squares of the difference. The found approximate exponential function is used as a trend component in this embodiment.

FIG. 5A shows how a trend component is extracted by exponential approximation at Step S2a. In FIG. 5A, line a represents the measured signal, line b represents the trend component extracted by exponential approximation, and line c represents the oscillatory component extracted by removal of the trend component. As in the first embodiment, a component having an oscillation period of about 0.1 s is the most intensive in the time range from 0.6 s to 0.8 s. As a result, the wavelet analysis provides a similar wavelet scalogram as shown in FIG. 3. Thus, the analysis method of this embodiment successfully serves to extract only a desired oscillatory component.

Accordingly, the analysis method of this embodiment produces similar effects and advantages as of the first embodiment, and further provides a suitable analysis for a signal waveform such as an acceleration signal which changes through two steps as typical in an automatic transmission vehicle.

Third Embodiment

Figure 6:
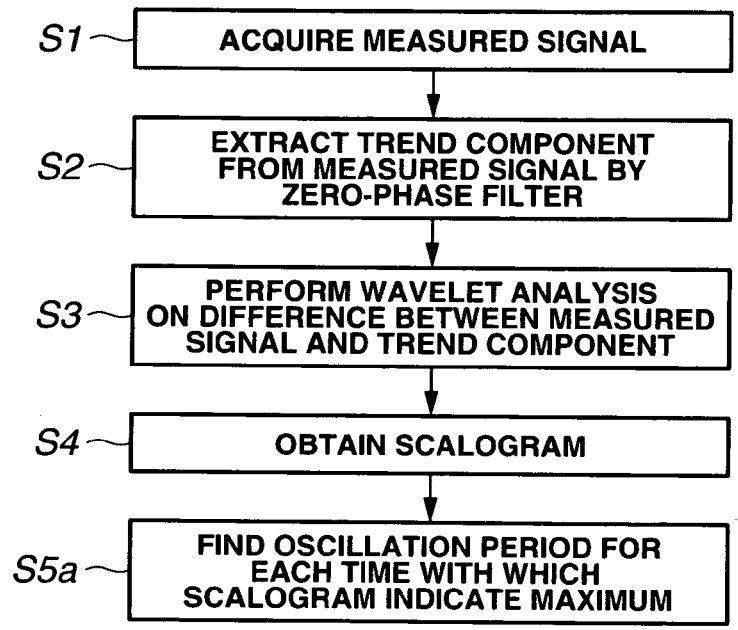
FIG. 6 is a flow chart showing an algorithm in accordance with a third embodiment of the present invention.

FIG. 6 is a flow chart showing an algorithm in accordance with a third embodiment of the present invention. As shown in FIG. 6, the algorithm comprises Steps S1 to S5a to be executed in sequence. The analysis method of the third embodiment differs from that of the first embodiment of FIG. 1 in that Step S5a is provided instead of Step S5 of the first embodiment. Specifically, Step S1 is to acquire and record a measured signal on a piece of recording media, such as a data recorder. Step S2 is to extract a trend component from the measured signal using a zero-phase filter. The zero-phase filter serves to extract a trend component without phase delay. Step S3 is to extract an oscillatory component from the measured signal, that is, to determine the difference between the trend component and the measured signal, and to perform a wavelet analysis on this oscillatory component. Step S4 is to obtain a wavelet scalogram of the oscillatory component of the measured signal. Step S5a is to find an oscillation period for each time with which the wavelet scalogram indicates a local maximum. The found oscillation periods are used to find local maximums and local minimums of the measured signal.

According to this embodiment, it is possible to extract accurately a major or dominant frequency component for each time by performing the wavelet analysis on the oscillatory component determined by removal of the trend component, even when the measured signal contains two or more frequency components and the magnitude of each frequency component changes in time.

Fourth Embodiment

Figure 7:
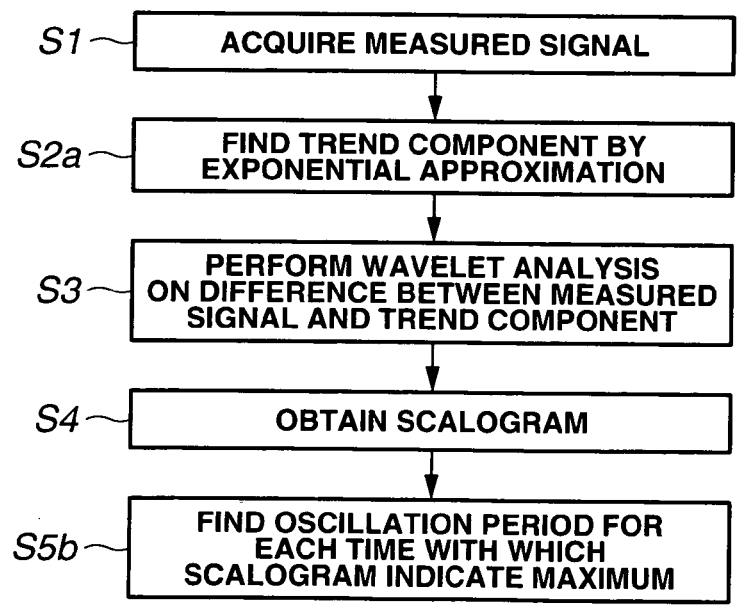
FIG. 7 is a flow chart showing an algorithm in accordance with a fourth embodiment of the present invention.

FIG. 7 is a flow chart showing an algorithm in accordance with a fourth embodiment of the present invention. As shown in FIG. 7, the algorithm comprises Steps S1 to S5b to be executed in sequence. The analysis method of the fourth embodiment differs from that of the second embodiment shown in FIG. 4 in that Step S5b is provided instead of Step S5 of the first embodiment. Specifically, Step S1 is to acquire and record a measured signal on a piece of recording media, such as a data recorder. Step S2a is to find a trend component by exponential approximation. Step S3 is to extract an oscillatory component from the measured signal, that is, to determine the difference between the trend component and the measured signal, and to perform a wavelet analysis on this oscillatory component. Step S4 is to obtain a wavelet scalogram of the oscillatory component of the measured signal. Step S5b is to find an oscillation period for each time with which the wavelet scalogram indicates a local maximum. The found oscillation periods are used to find local maximums and local minimums of the measured signal. According to this embodiment, it is possible to extract accurately a dominant frequency component for each time by performing the wavelet analysis on the oscillatory component determined by removal of the trend component, even when the measured signal contains two or more frequency components and the magnitude of each frequency component changes in time.

Fifth Embodiment

Figure 8:
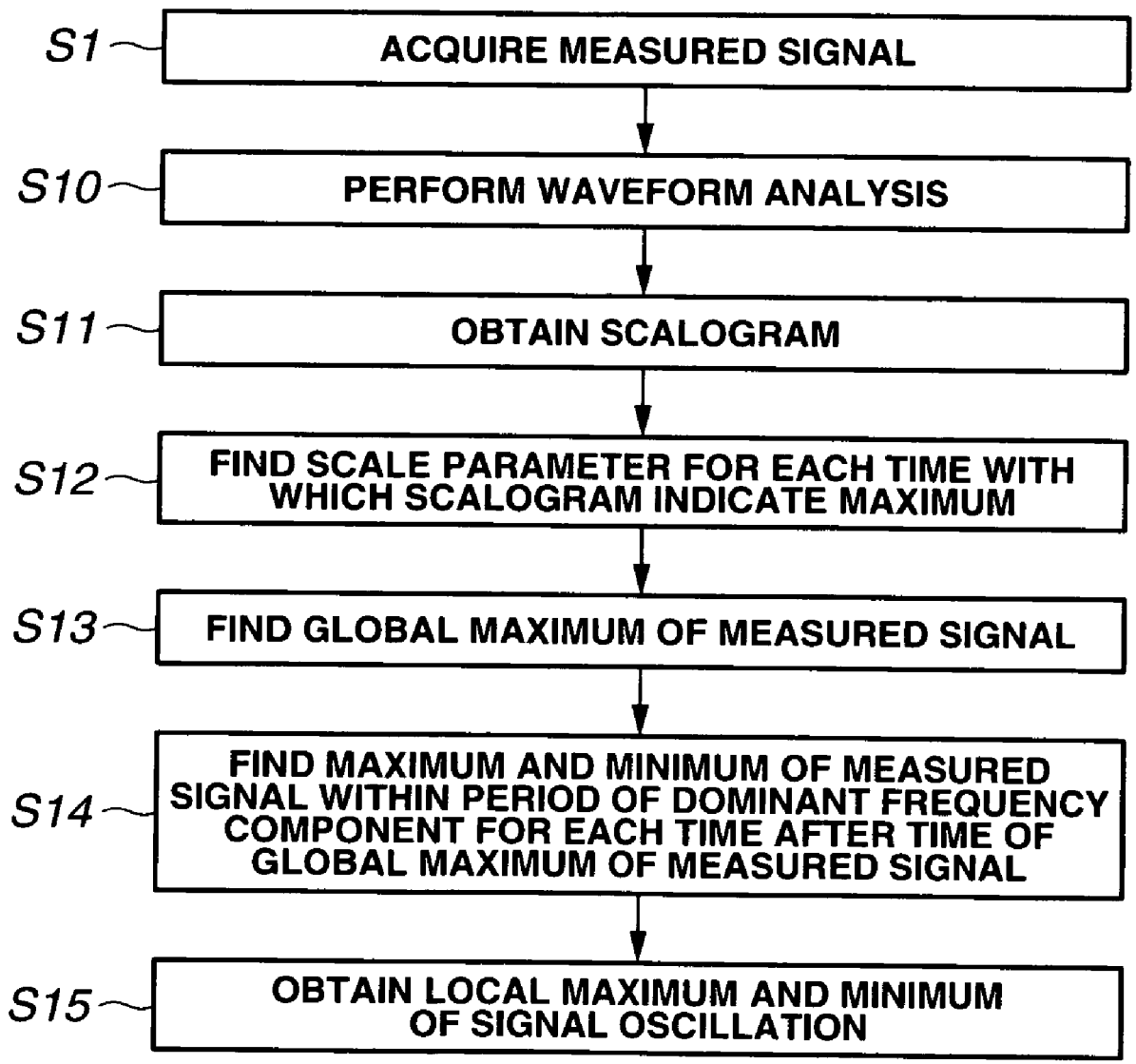
FIG. 8 is a flow chart showing an algorithm in accordance with a fifth embodiment of the present invention.

FIG. 8 is a flow chart showing an algorithm in accordance with a fifth embodiment of the present invention. As shown in FIG. 8, the algorithm comprises Steps S1 to S15 to be executed in sequence. In the fifth and following embodiments, the above signal waveform analysis method is used to analyze vehicle dynamic characteristics. When a vehicle is under acceleration or deceleration, the acceleration signal rises or falls stepwise with an oscillating phenomenon containing a superimposed frequency components. The extremums of the signal oscillation at acceleration and deceleration are detected in the below-described analysis. Specifically, Step S1 is to acquire and record a measured signal on a piece of recording media, such as a data recorder. Step S10 is to perform a signal waveform analysis in which Step S2 or S2a and Step S3 shown in the first, second, third and fourth embodiments are performed. For example, Step S10 is to extract a trend component from the measured signal using a zero-phase filter which serves to extract a trend component without phase delay, to extract an oscillatory component from the measured signal by removal of the trend component, and to perform a wavelet analysis on the oscillatory component. Step S11 is to obtain a corresponding wavelet scalogram. Step S12 is to find the value of a scale parameter indicative of a central oscillation period of passing frequency components for each time with which the wavelet scalogram indicates a maximum intensity. The found scale parameter value is henceforth referred to as "dominant oscillation period". Step S13 is to find a global maximum of the measured signal in accordance with the found dominant oscillation period. Step S14 is to find maximums and minimums of the measured signal within the dominant oscillation period for each time after a time at which the measured signal indicates the global maximum. Step S15 is to obtain local maximums and minimums of the signal oscillation based on the result of Step S14.

Figure 9:
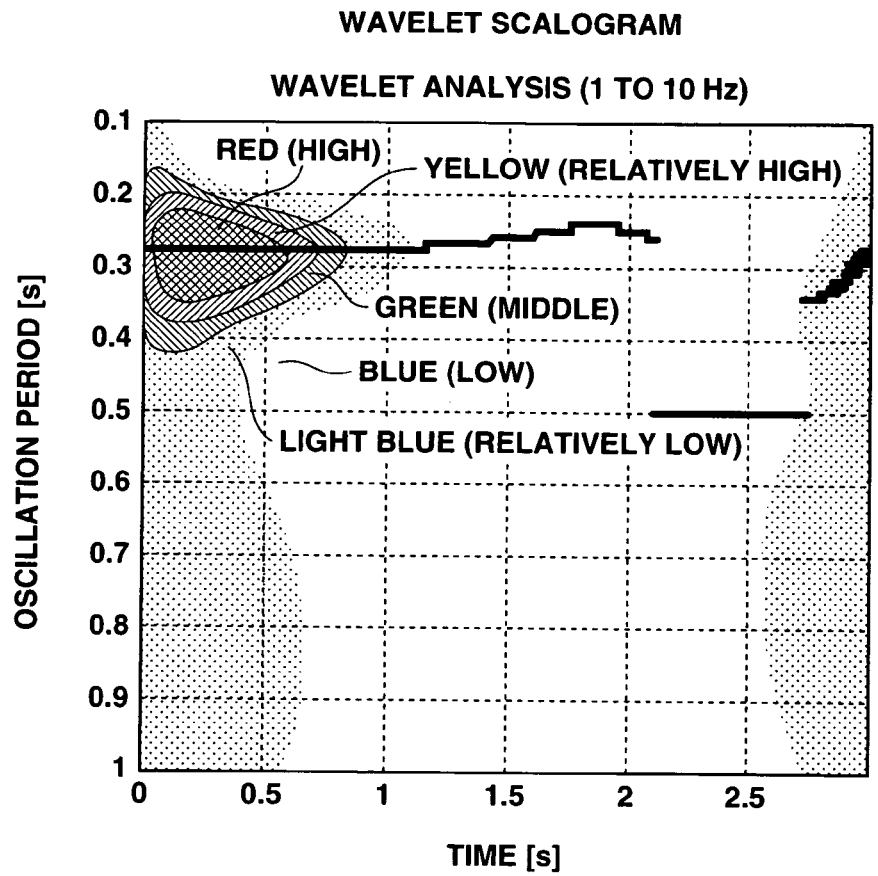
FIG. 9 is a graph showing a wavelet scalogram generated by a wavelet analysis in the fifth embodiment.

FIG. 9 shows a wavelet scalogram produced by the wavelet analysis of Step S11. In FIG. 9, the horizontal axis indicates a time in synchronization with the measured signal, while the vertical axis indicates the oscillation period of each frequency component contained in the measured signal at each time. Each colored point in a wavelet scalogram indicates the intensity of each frequency component. As the color varies from blue to red, the intensity increases. The bold lines in FIG. 9 is the result of the operation of Step S12, showing the dominant oscillation period for each time with which the intensity of the corresponding frequency component is maximum.

Figure 10:
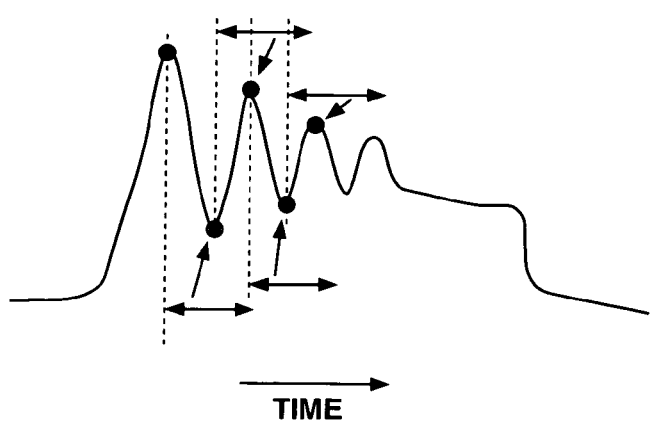
FIG. 10 is a view showing a concept of finding extremums of a signal in the fifth embodiment.
Figure 11:
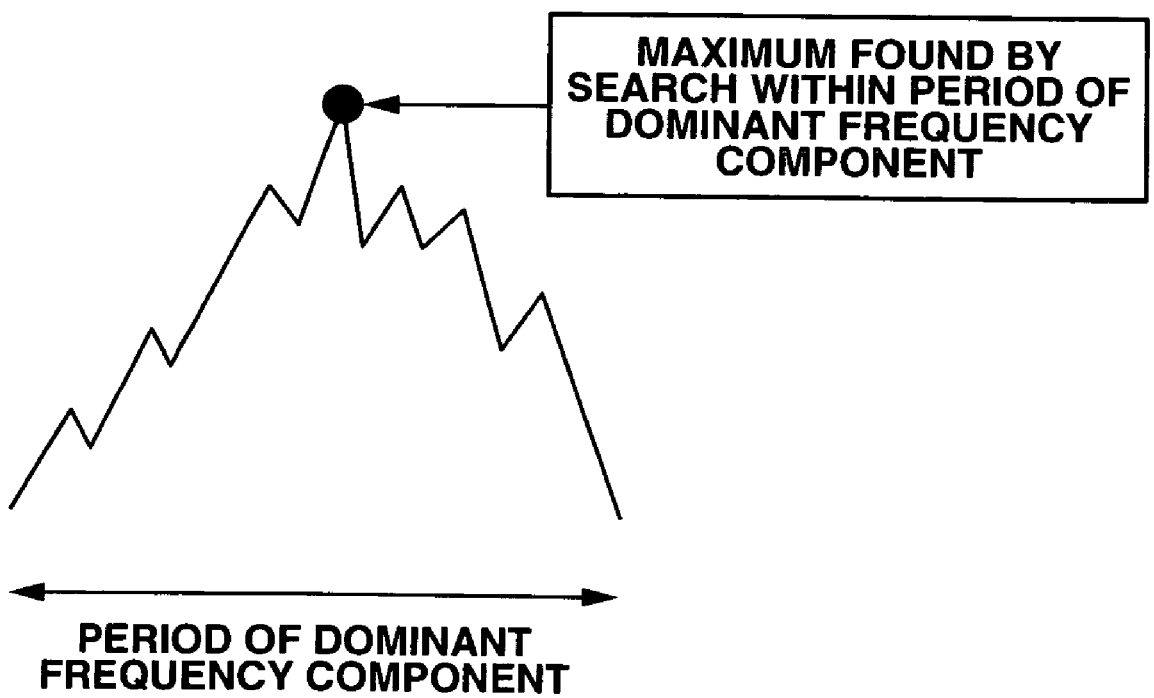
FIG. 11 is a view showing a concept of finding a local maximum within one period of a dominant frequency component of the signal in the fifth embodiment.

FIG. 10 is a view showing a concept of the process of Step S14, where local maximums and minimums are found based on the dominant oscillation period as shown by the bold line of FIG. 9. Specifically, the horizontal arrows each indicate the magnitude of the dominant oscillation period at each time. The most left solid circle indicates the global maximum as a starting point of this process. The second left solid circle indicates the local minimum within the width of the arrow starting from the horizontal position of the first left solid circle. Similarly, the third left solid circle indicates the local maximum within the width of the arrow starting from the horizontal position of the second left solid circle. Further, the second right solid circle indicates the local minimum within the width of the arrow starting from the horizontal position of the third left solid circle, and the first right solid circle indicates the local maximum within the width of the arrow starting from the horizontal position of the second right solid circle. Thus, as shown in FIG. 11, a local maximum is found within one period of the dominant frequency component.

According to this embodiment, the process of evaluating vehicle driveability, which is manually performed by an operator conventionally, can be performed by a computer to find local minimums and maximums, eliminating variation in operator's standard of evaluation. Even when the measured signal contains an oscillatory component with a small amplitude as a noise in addition to a dominant frequency component, it is possible to find easily a maximum (or local maximum) within one period of the dominant frequency component and a minimum (or local minimum) within one period of the dominant frequency component using the wavelet analysis.

Sixth Embodiment

Figure 12:
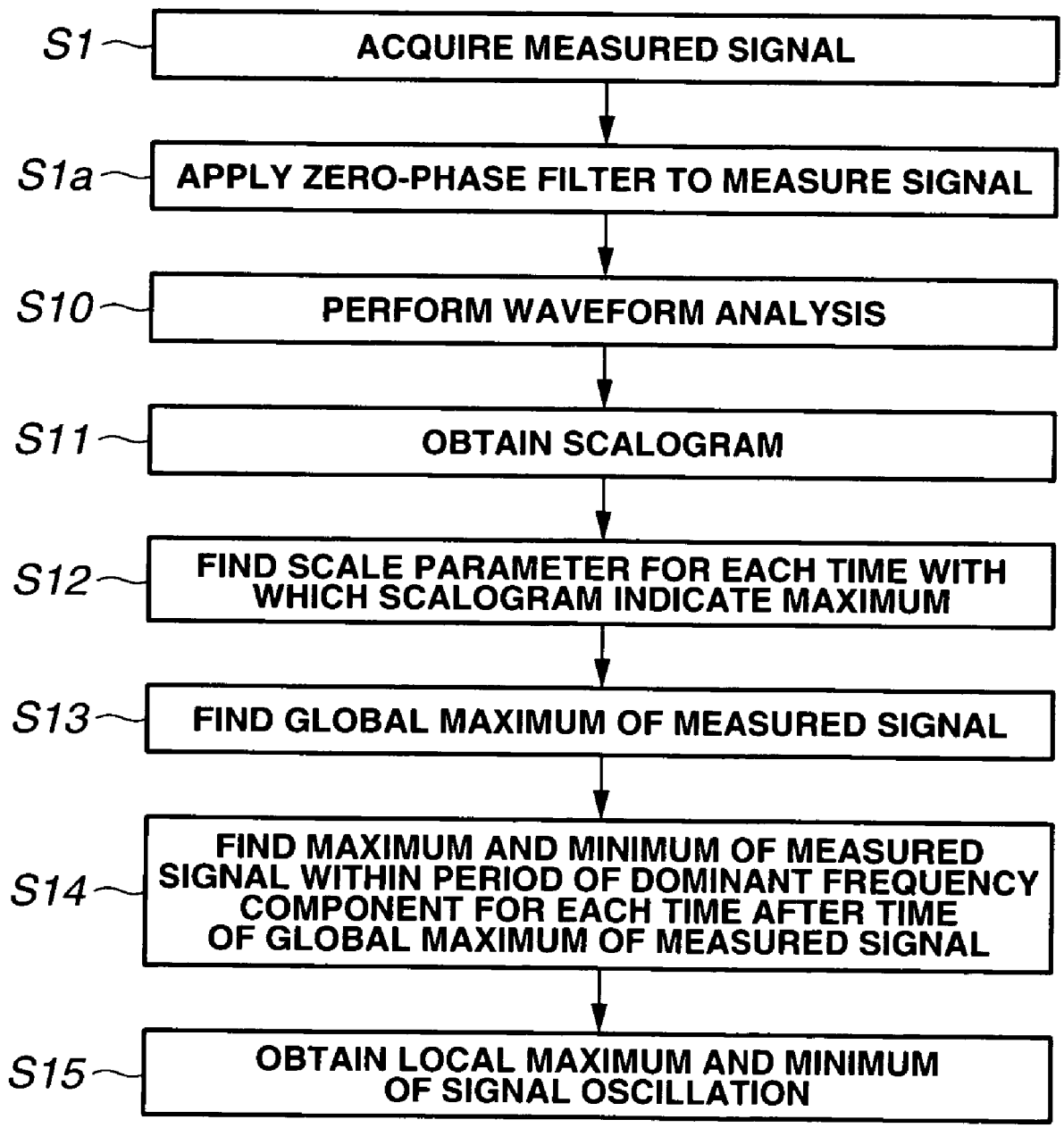
FIG. 12 is a flow chart showing an algorithm in accordance with a sixth embodiment of the present invention.
Figure 13:
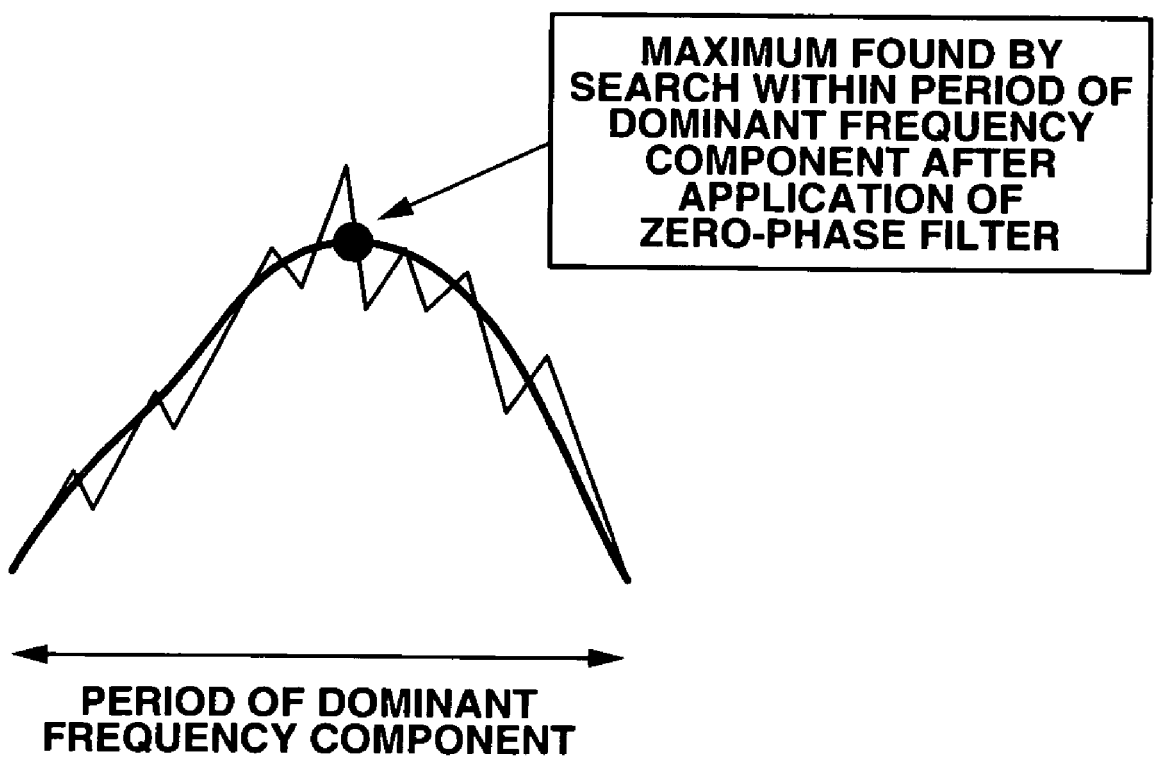
FIG. 13 is a view showing a concept of finding a local maximum within one period of a dominant frequency component of a signal in the sixth embodiment.

FIG. 12 is a flow chart showing an algorithm in accordance with a sixth embodiment of the present invention. As shown in FIG. 12, the algorithm comprises Steps S1 to S15 to be executed in sequence. The analysis method of the sixth embodiment differs from that of the fifth embodiment shown in FIG. 5 in that Step S1a is provided to apply a zero-phase filter to the measured signal. The noise component contained in the measured signal is removed without phase change by the zero-phase filter. FIG. 13 shows a concept of the analysis method. In FIG. 13, the thin line represents a section of the measured signal containing the noise component within one period of the dominant frequency component, while the bold line represents the dominant frequency component produced by removal of the noise component by the zero-phase filter. The dominant frequency component undergoes Step S10 and the following steps so that the maximum is found within one period as shown by the solid circle in FIG. 13. According to this embodiment, it is possible to obtain the extremum of the dominant frequency component produced by removal of the noise component.

Seventh Embodiment

Figure 14:
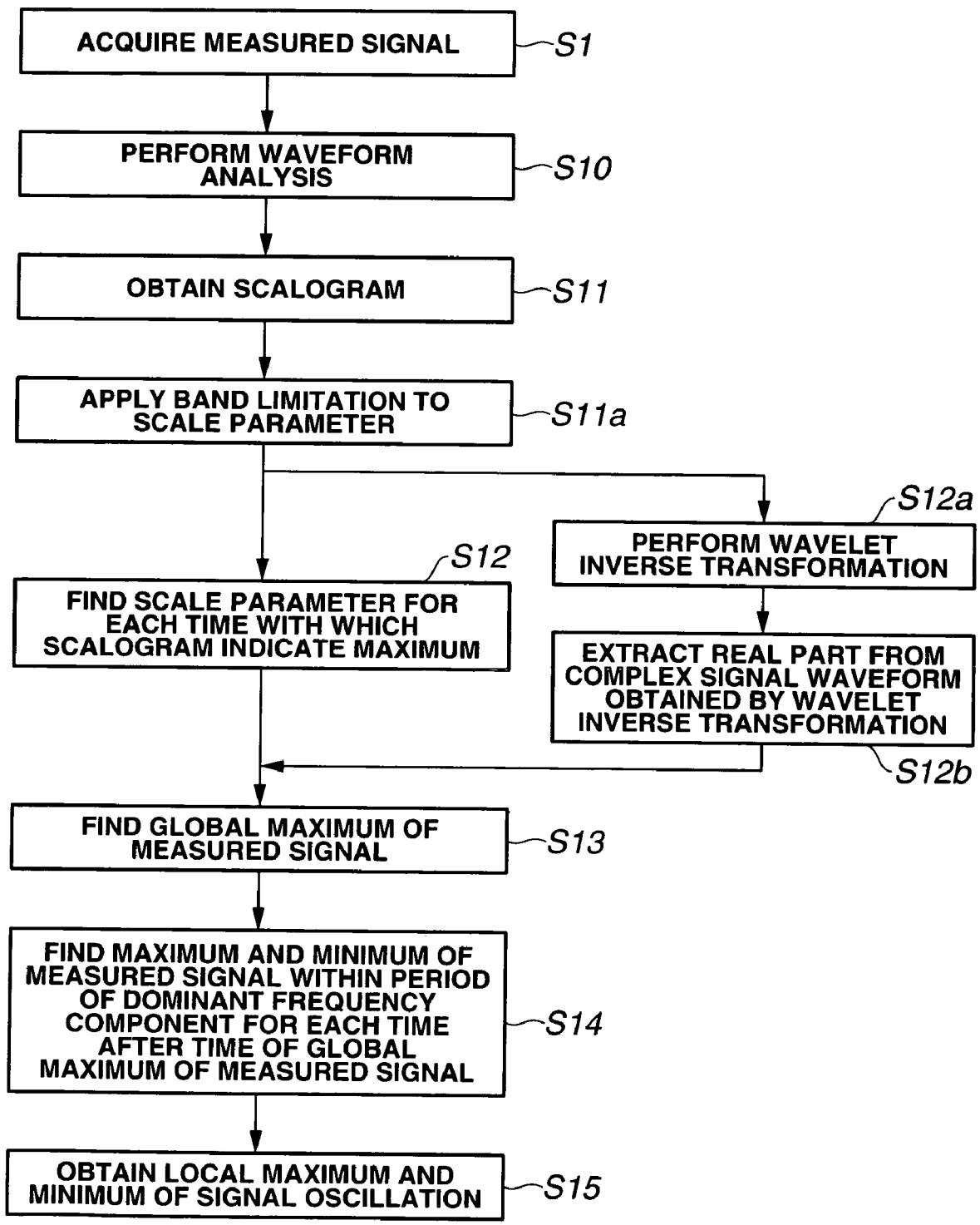
FIG. 14 is a flow chart showing an algorithm in accordance with a seventh embodiment of the present invention.

FIG. 14 is a flow chart showing an algorithm in accordance with a seventh embodiment of the present invention. As shown in FIG. 14, the algorithm comprises Steps S1 to S15 to be executed in sequence. The analysis method of the seventh embodiment differs from that of the fifth embodiment shown in FIG. 8 in that Steps S11a, S12a and S12b are provided. Step S11a is to restrict the scale parameter within a band, that is, to set the intensity of the range out of the scale parameter band to zero in the wavelet scalogram. For example, in the case of the wavelet scalogram of FIG. 9, Step S11a restricts the scale parameter band to a range of 0.2 to 0.4 and sets the intensity of oscillation periods out of the restricted scale parameter band to zero. Alternatively, Step S11a may be provided to set the intensity of the region as indicated by the blue region in FIG. 9 to zero where the wavelet scalogram value is below a certain threshold value. The restricted wavelet scalogram is used to find at Step S4 the scale parameter value with which the wavelet scalogram indicates a maximum, and applied with an inverse wavelet transform at Step S12a. The wavelet scalogram, when applied with the inverse wavelet transform, is converted into a complex signal waveform containing a real part as shown in FIG. 10. Step S12b is to extract a real part from the complex signal waveform obtained by the inverse wavelet transform. Step S13 is to find extremums of the real part for each time within the one period of the dominant frequency component. Thus, Step S13 and the following steps process the real part extracted at Step S12b. According to this embodiment, it is possible to obtain extremums of the dominant frequency component produced by removal of the noise component.

Eighth Embodiment

Figure 15:
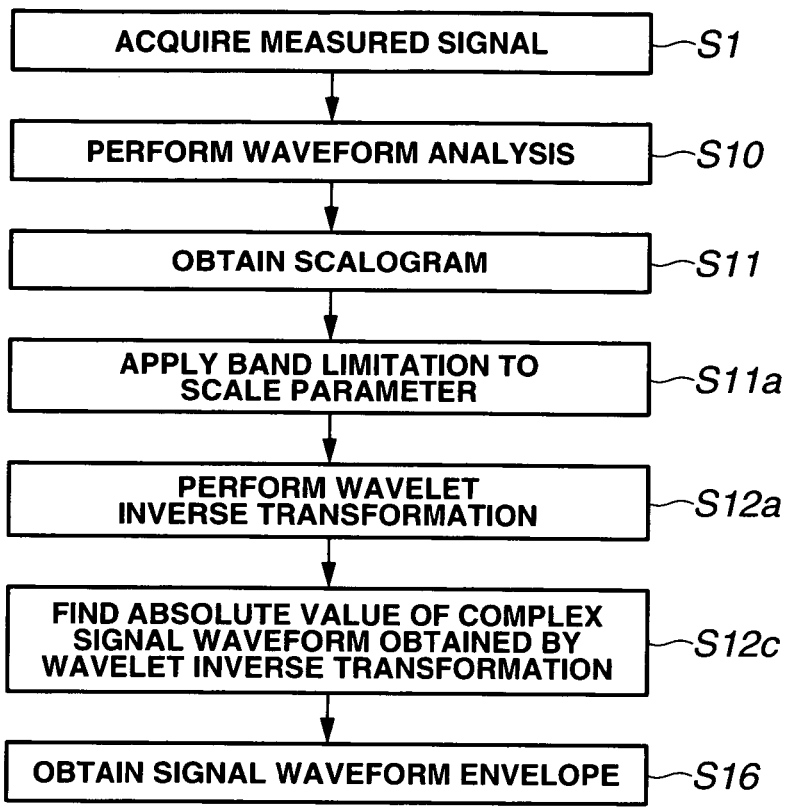
FIG. 15 is a flow chart showing an algorithm in accordance with an eighth embodiment of the present invention.

FIG. 15 is a flow chart showing an algorithm in accordance with an eighth embodiment of the present invention. As shown in FIG. 15, the algorithm comprises Steps S1 to S16 to be executed in sequence. In the eighth embodiment, the envelope of an oscillatory signal waveform is found. The analysis method of the eighth embodiment differs from that of the seventh embodiment of FIG. 14 in that Steps S12c and S16 are provided instead of Steps S12, S12b, S13, S14 and S15. In the eighth embodiment, in consideration that the wavelet scalogram obtained at Step S11 contains information on frequency, phase and amplitude, Step S11a is to apply a band limitation to the scale parameter to find the dominant frequency component of the measured signal. First, in the region indicated by blue in FIG. 9, the intensity is set to zero. Step S12a is to perform a wavelet inverse transformation. Step S12c is to compute the magnitude of the complex signal waveform obtained by the wavelet inverse transformation. Step S16 is to obtain the magnitude of the signal oscillation or the envelope of the signal waveform based on the dominant frequency component.

Figure 16:
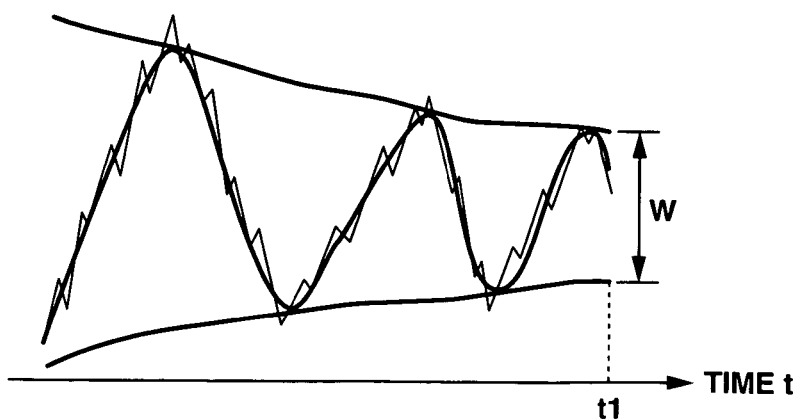
FIG. 16 is a view showing a concept of finding an envelope of a signal waveform in the eighth embodiment.

FIG. 16 shows the envelope found by the above analysis method. The found envelope may be used to analyze the magnitude of signal oscillation quantitatively and to find a time t1 when the magnitude of signal oscillation falls below a value W. Even when a noise is overlapped on the oscillatory signal waveform, setting to zero the value of the region of high frequency through the band limitation of scale parameter at Step S12a allows to find the envelope of the dominant frequency component produced by removal of the noise component.

Ninth Embodiment

Figure 17:
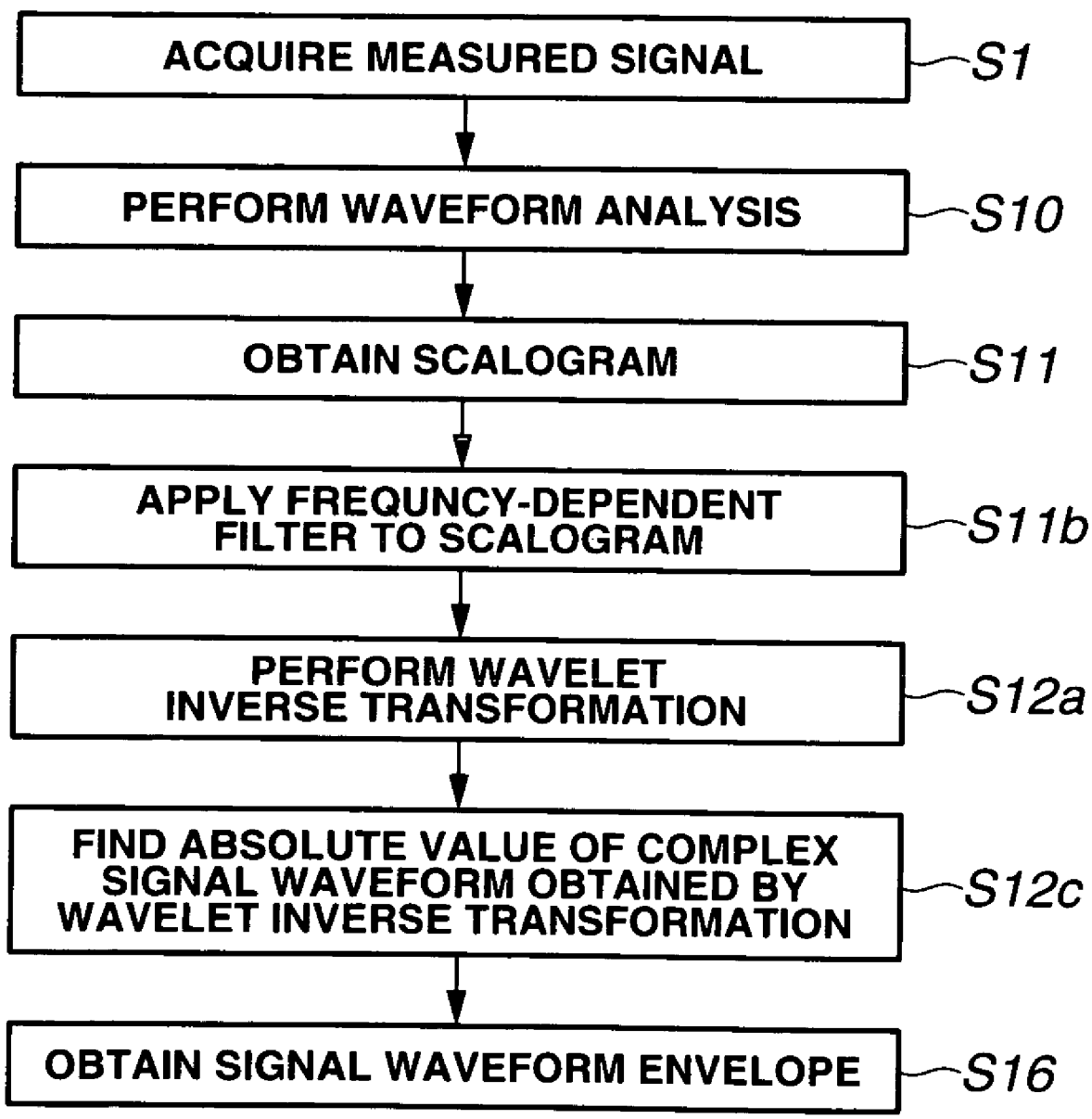
FIG. 17 is a flow chart showing an algorithm in accordance with a ninth embodiment of the present invention.

FIG. 17 is a flow chart showing an algorithm in accordance with a ninth embodiment of the present invention. As shown in FIG. 17, the algorithm comprises Steps S1 to S16 to be executed in sequence. The analysis method of the ninth embodiment differs from that of the eighth embodiment of FIG. 15 in that Step S11b is provided to apply a filter having a frequency-gain characteristic to the wavelet scalogram instead of Step S11a which is to apply the band limitation to the scale parameter. The frequency-dependent filter of Step S11b which has an arbitrary frequency-gain characteristic is applied to the wavelet scalogram obtained at Step S11 by performing a wavelet analysis, in order to emphasize a desired frequency band of signal oscillation. Step S12a is to perform a wavelet inverse transformation. Step S12c is to compute the absolute value of the complex signal waveform obtained by the wavelet inverse transformation. Step S16 is to obtain the magnitude of the signal oscillation or the envelope of the signal waveform based on the dominant frequency component.

Figure 18:
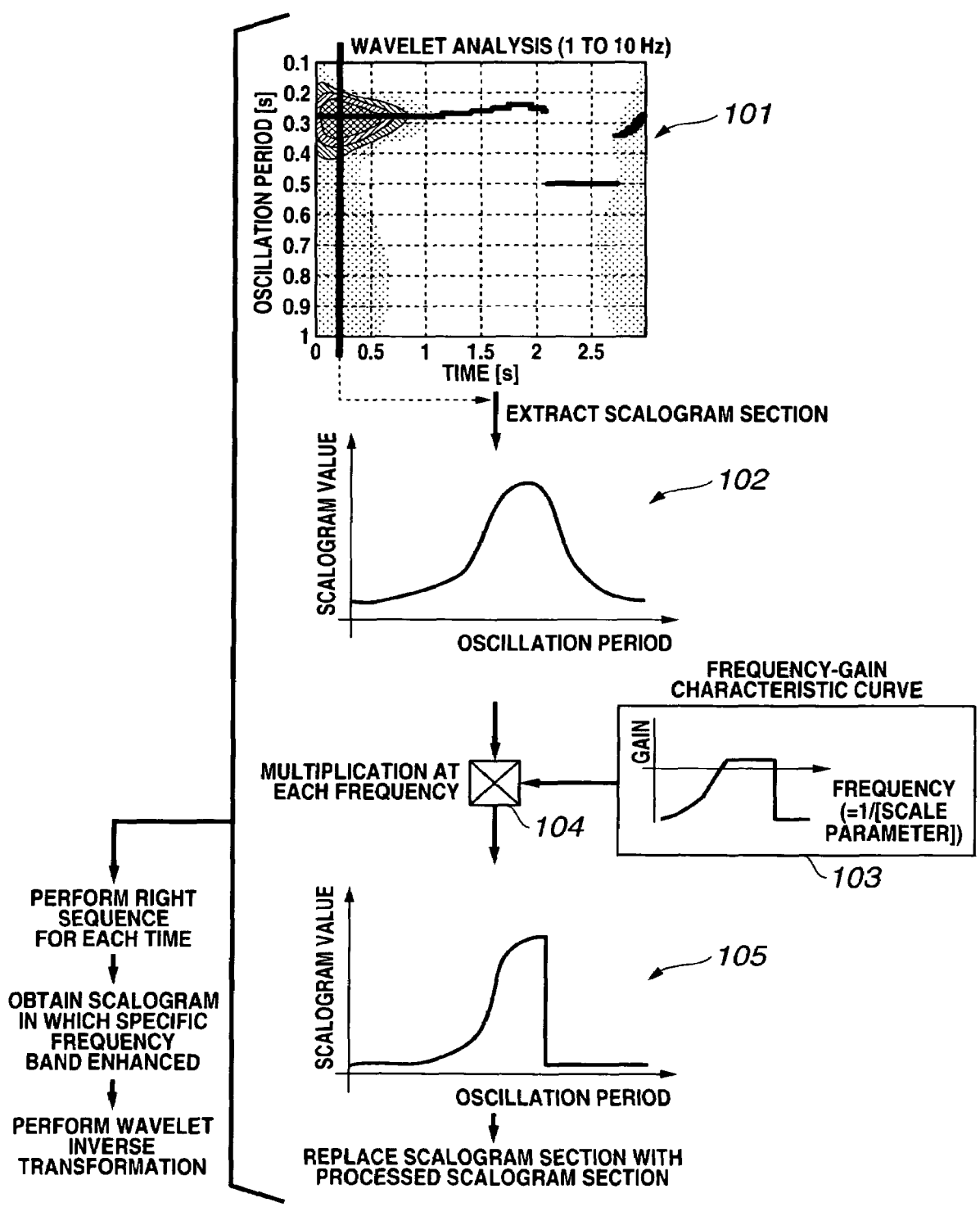
FIG. 18 is a view showing a concept of a process in accordance with the ninth embodiment.
Figure 19:
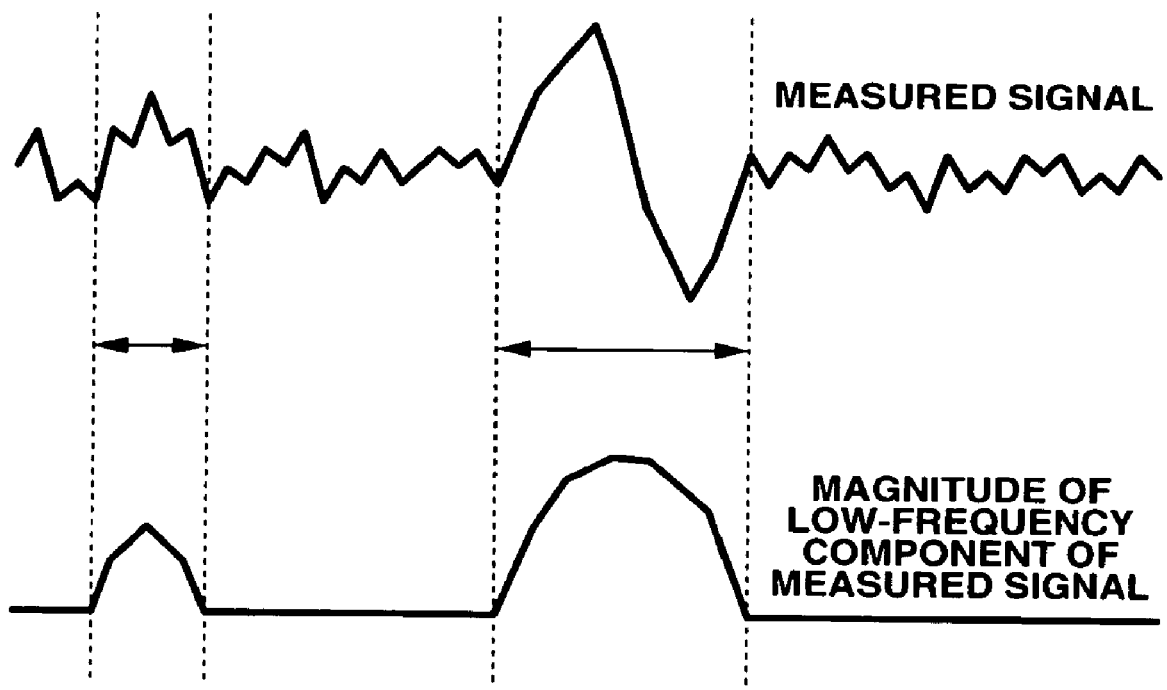
FIG. 19 is a view showing a process performed by a filter having a frequency-gain characteristic in the ninth embodiment.

FIG. 18 shows a concept of Steps S11 through S12a of FIG. 17. In FIG. 18, a section of wavelet scalogram 102 at a certain time is extracted from wavelet scalogram 101, and is multiplied at a multiplier 104 with a signal of a frequency-gain characteristic curve 103, to produce a signal 105. This process is repeated for each time to convert the original wavelet scalogram into a wavelet scalogram in which a specific frequency band is emphasized. The resulting signal is applied with the wavelet inverse transform at Step S12a. FIG. 19 shows a result of the above process. In FIG. 19, when the filter of Step S11b is designed to have a frequency-gain characteristic that the high-pass gain is set low and the low-pass gain is set to 1, the magnitude of the oscillatory component containing emphasized lower frequency components is obtained based on the measured signal.

Tenth Embodiment

Figure 20:
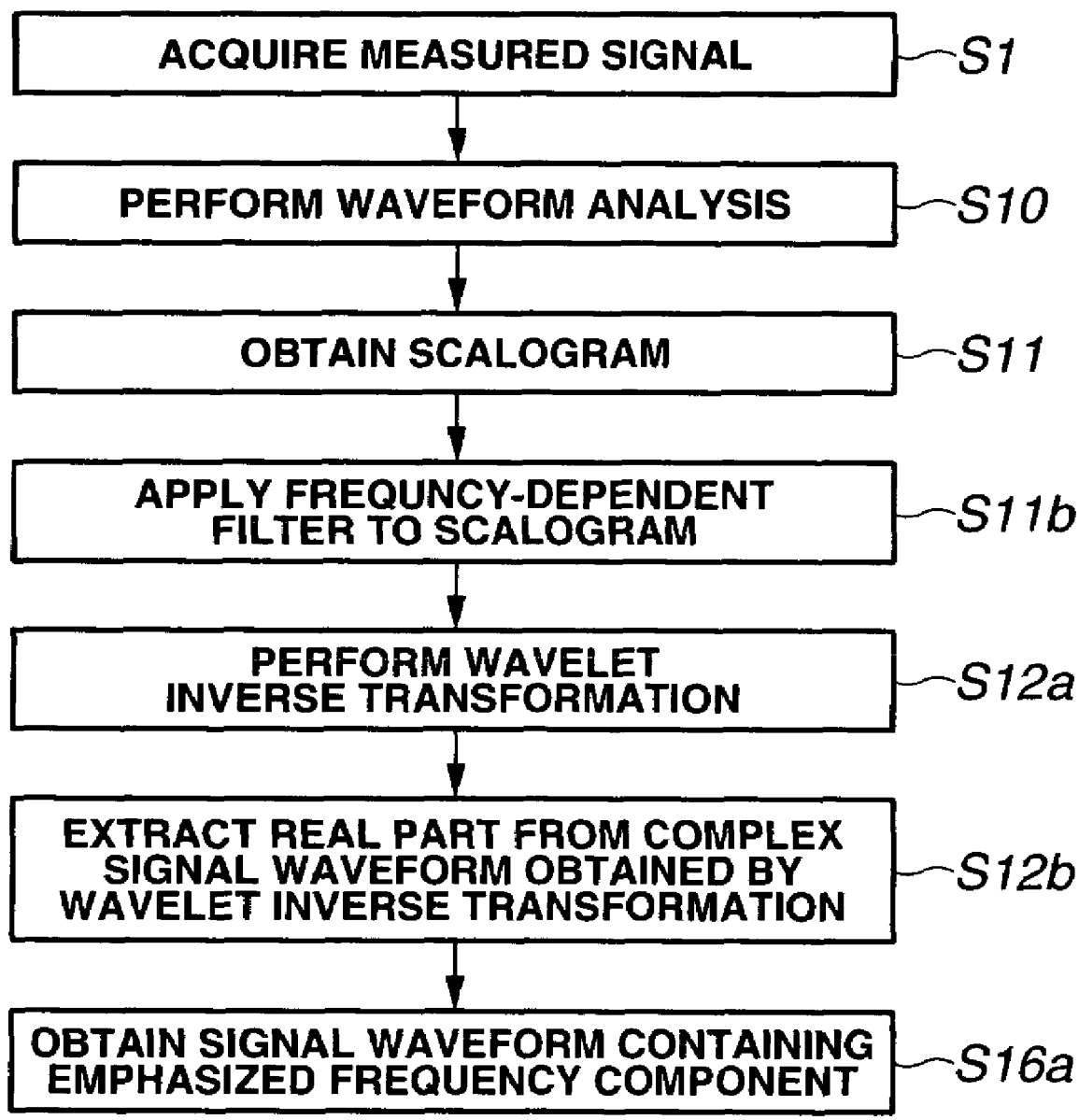
FIG. 20 is a flow chart showing an algorithm in accordance with a tenth embodiment of the present invention.

FIG. 20 is a flow chart showing an algorithm in accordance with a tenth embodiment of the present invention. In the tenth embodiment, an oscillatory signal waveform containing a desired frequency components is extracted. As shown in FIG. 20, the algorithm comprises Steps S1 to S16a to be executed in sequence. The analysis method of the tenth embodiment differs from that of the ninth embodiment of FIG. 17 in that Steps S12b and S16a are provided to find the real part of a complex signal waveform instead of Steps S12c and S16. Step S12b serves as in the method of FIG. 14. Step S11 is to obtain the wavelet scalogram, Step S11b is to emphasize a frequency band of each time step of the wavelet scalogram desired to be analyzed, and Step S12a is to apply a wavelet inverse transformation to the wavelet scalogram to extract a signal waveform containing only frequency components desired or emphasized at Step S11b from the measured signal acquired at Step S1. The signal waveform produced by the wavelet inverse transformation is in the form of a complex number. Step S12b is to extract a real part from the complex signal waveform. Step S16a is to obtain a signal waveform containing only desired frequency components.

Accordingly, as in the ninth embodiment, the magnitude of the oscillatory component containing emphasized lower frequency components is obtained based on the measured signal.

Eleventh Embodiment

Figure 21:
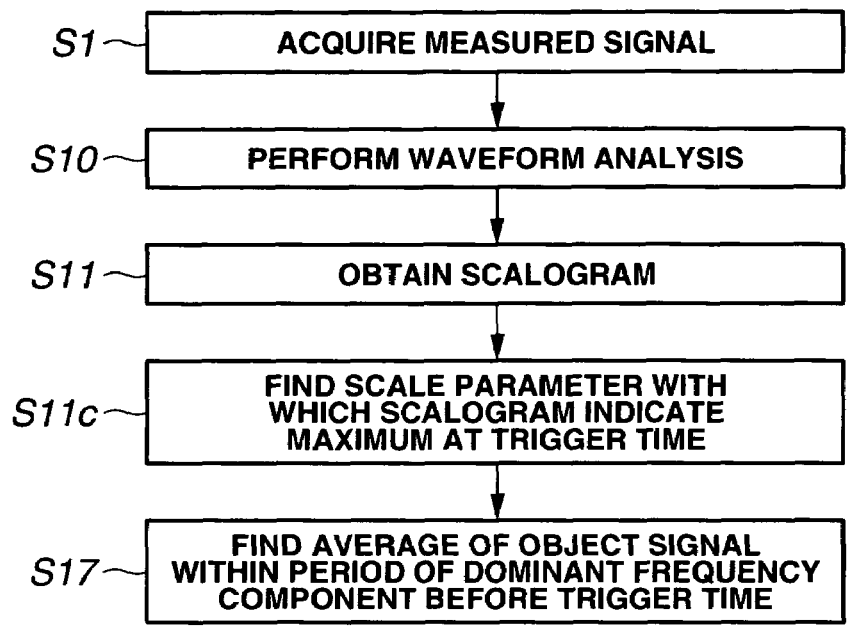
FIG. 21 is a flow chart showing an algorithm in accordance with an eleventh embodiment of the present invention.
Figure 22:
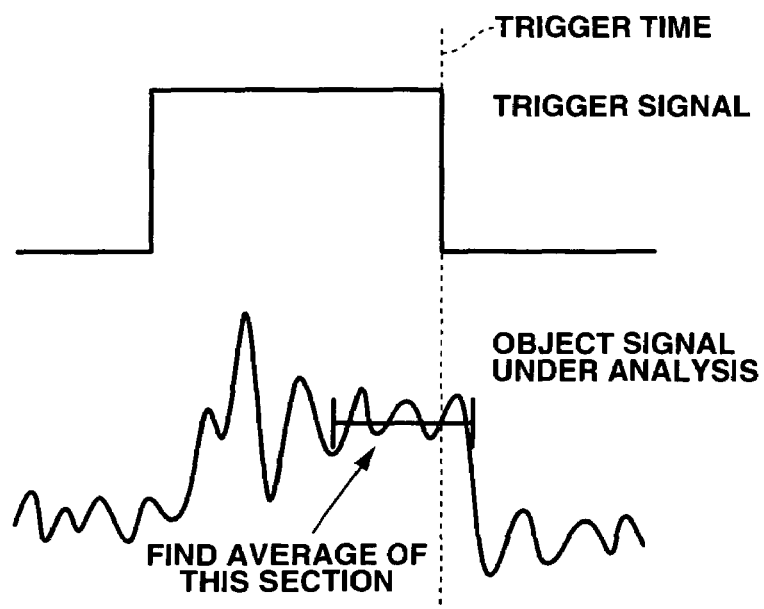
FIG. 22 is a view showing a concept of finding an average of a measured signal before a trigger time in the eleventh embodiment.

FIG. 21 is a flow chart showing an algorithm in accordance with an eleventh embodiment of the present invention. As shown in FIG. 21, the algorithm comprises Steps S1 to S17 to be executed in sequence. In the eleventh embodiment, the average value of a section of a measured signal before occurrence of a trigger signal is computed. FIG. 22 is a view showing a concept of finding an average of a measured signal before a trigger time in the eleventh embodiment. In FIG. 22, a trigger signal and an analysis-object signal are shown. A section of the measured signal indicated in FIG. 22 is analyzed in this embodiment. Specifically, Step S1 is to acquire and record a measured signal on a piece of recording media, such as a data recorder. Step S10 is to perform a signal waveform analysis to extract a trend component and perform a wavelet analysis on an oscillatory component produced by removal of the trend component. Step S11 is to obtain a corresponding wavelet scalogram. Step S11c is to find a dominant frequency component having an oscillation period with which the wavelet scalogram indicates maximum at a trigger time. Step S17 is to extract a section of the measured signal corresponding to one period of the dominant frequency component and to find the average value of the section as an average of the analysis-object signal before the trigger signal.

Figure 23:
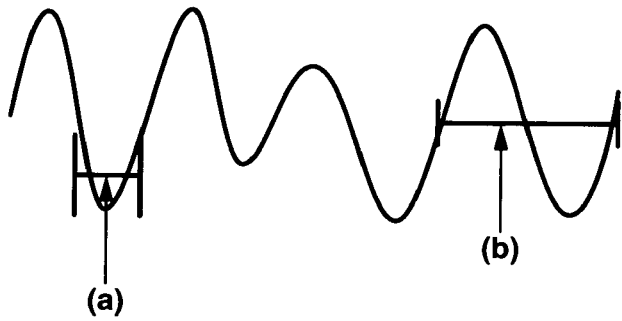
FIG. 23 is a view showing a concept of finding an average of a measured signal in the eleventh embodiment.

If as indicated by (a) in FIG. 23 the average is computed based on a period which is not identical to one period of the dominant frequency component, the computed average is deviated from the average of the whole. On the other hand, in this embodiment, as indicated by (b) in FIG. 23, the average is computed based on one period of the dominant frequency component. This allows to find the average of the whole correctly and easily without the influence of fluctuations in the signal waveform.

Twelfth Embodiment

Figure 24:
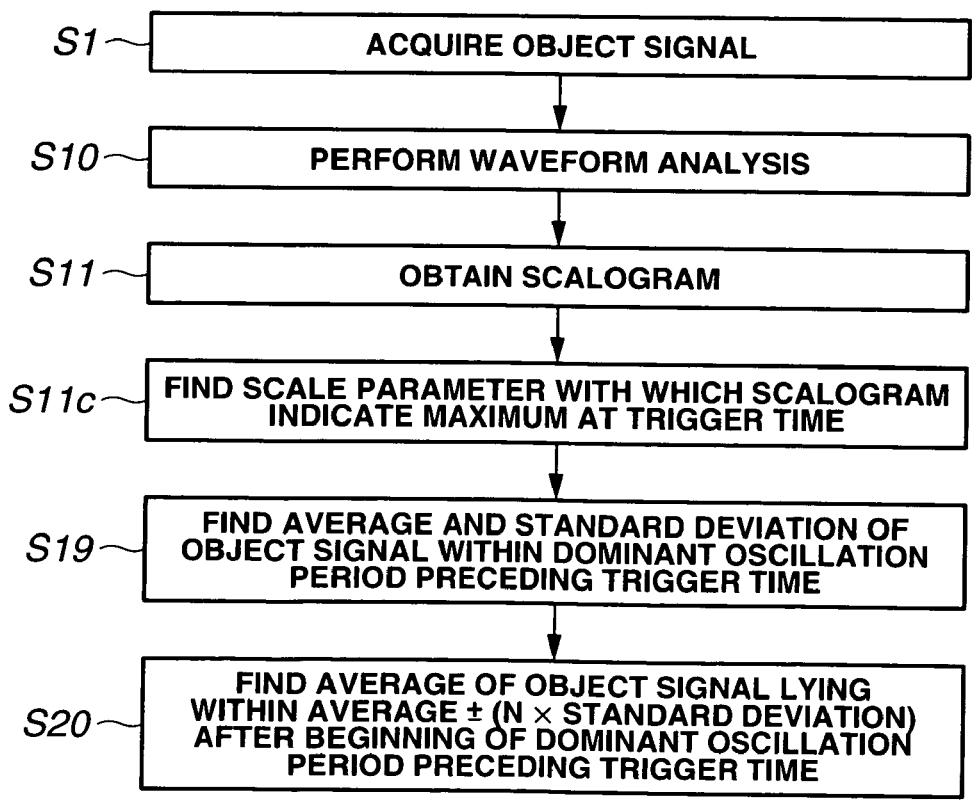
FIG. 24 is a flow chart showing an algorithm in accordance with a twelfth embodiment of the present invention.
Figure 25:
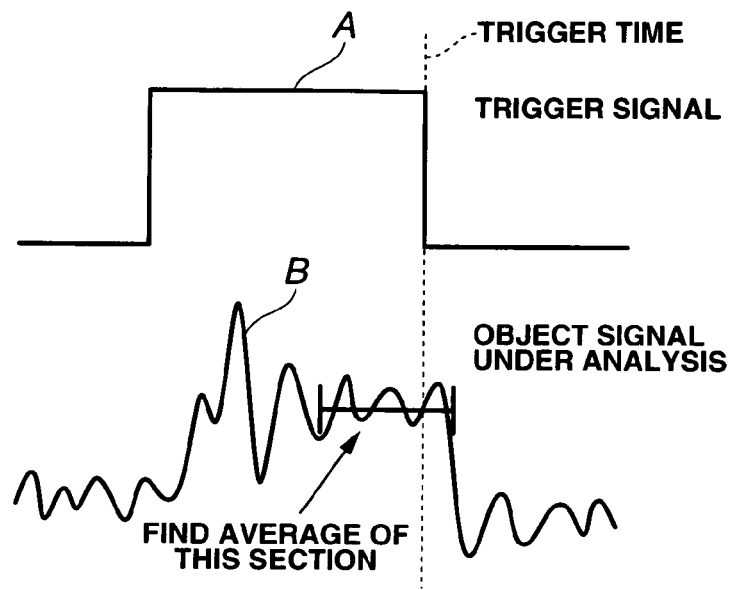
FIG. 25 is a view showing a concept of finding an average of a measured signal before an actual change of the measured signal in the twelfth embodiment.

FIG. 24 is a flow chart showing an algorithm in accordance with a twelfth embodiment of the present invention. As shown in FIG. 24, the algorithm comprises Steps S1 to S20 to be executed in sequence. In the twelfth embodiment, the average value of a section of a measured oscillating signal before a change caused by a trigger signal is computed. As shown in FIG. 25, the analysis method of this embodiment deals with a measured signal containing a trigger signal A and an analysis-object signal B. The analysis-object signal B falls in delay due to response delay of vehicle movement after trigger signal A falls. The analysis method of this embodiment differs from that of the eleventh embodiment of FIG. 21 in that Steps S19 and S20 are provided instead of Step S17. Step S19 is to compute the average value and standard deviation of a section of the analysis-object signal within one period of the dominant frequency component before the trigger time. Step S20 is to compute the average value of a section of the analysis-object signal which lies within limits of the product of ±N and the standard deviation after the beginning of the dominant frequency component period preceding the trigger time based on the average value and standard deviation found by Step S19. N is a positive value which may be arbitrarily set by an operator.

Figure 26:
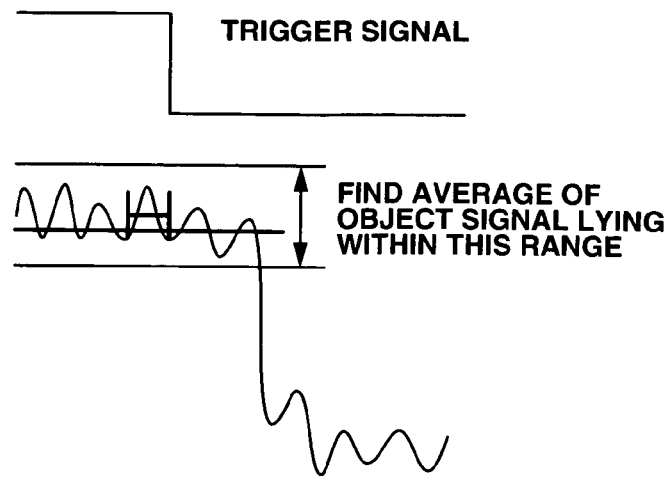
FIG. 26 is a view showing an example of finding an average of a measured signal before an actual change of the measured signal in the twelfth embodiment.
Figure 27:
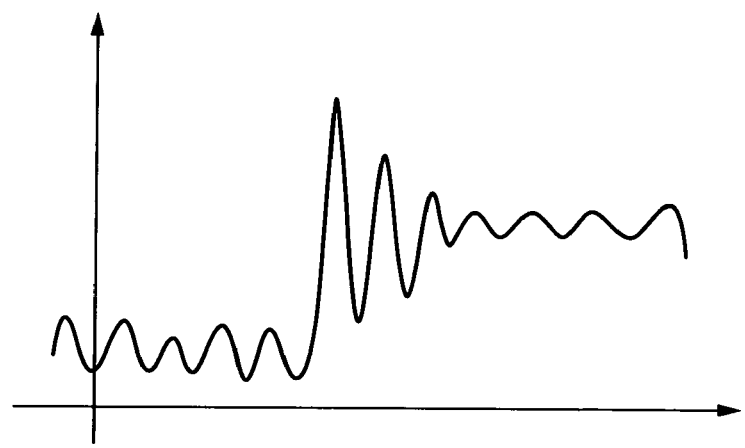
FIG. 27 is a graph showing an example waveform of measured signal (analysis-object signal).
Figure 28:
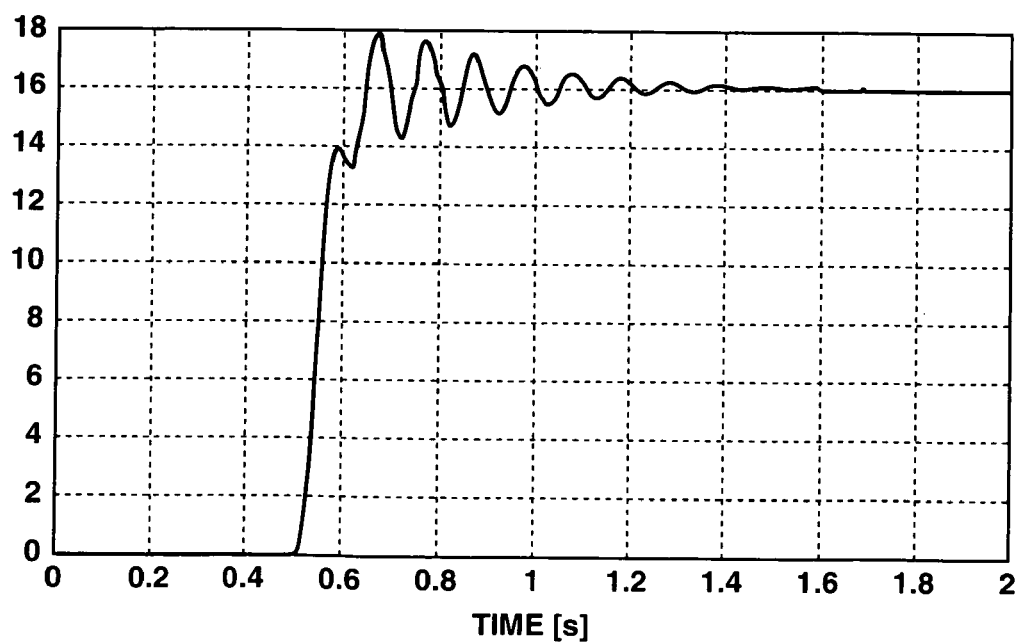
FIG. 28 is a graph showing an example signal waveform containing a trend component and an oscillatory component.
Figure 29:
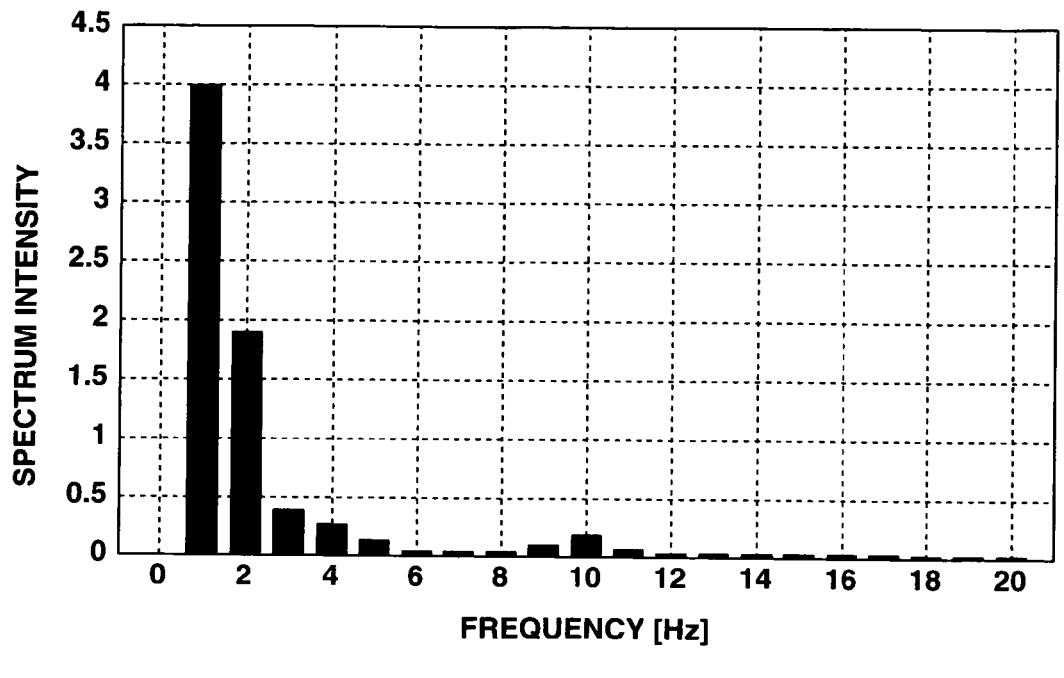
FIG. 29 is a graph showing a result of a Fourier analysis performed on the example signal waveform of FIG. 28.
Figure 30:
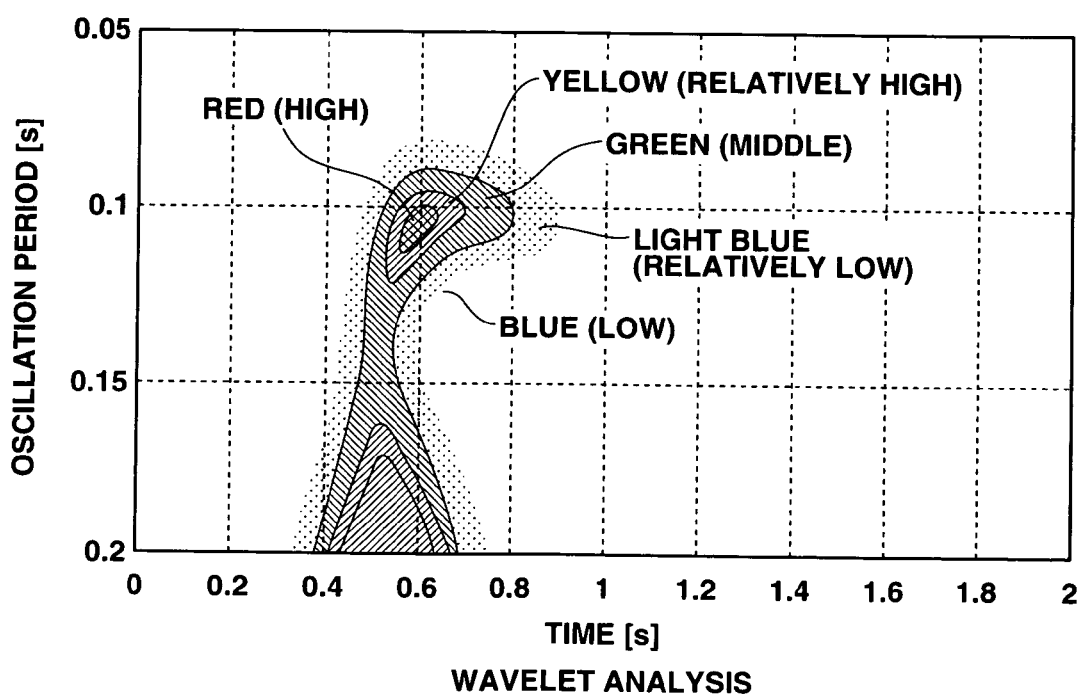
FIG. 30 is a graph showing a result of a wavelet analysis performed on the example signal waveform of FIG. 28.

As shown in FIG. 26, the average of the signal before change is determined by finding the average value of a section of the signal lying within a certain range at Steps S19 and S20.

This application is based on a prior Japanese Patent Application No. 2005-279033 filed on Sep. 27, 2005. The entire contents of this Japanese Patent Application No. 2005-279033 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A signal waveform analysis method comprising:
   determining a trend component of an object signal by applying a zero-phase filter to the object signal;
   determining an oscillatory component of the object signal by removing the trend component from the object signal;
   determining a wavelet scalogram by performing a wavelet analysis on the oscillatory component; and
   determining an oscillation period of the object signal with which the wavelet scalogram indicates a maximum.

2. A signal waveform analysis method comprising:
   determining a trend component of an object signal by approximating the object signal with an exponential function expression;
   determining an oscillatory component of the object signal by removing the trend component from the object signal;
   determining a wavelet scalogram by performing a wavelet analysis on the oscillatory component; and
   determining an oscillation period of the object signal with which the wavelet scalogram indicates a maximum.

3. The signal waveform analysis method as claimed in claim 1, wherein the determining an oscillation period of the object signal is implemented by determining an oscillation period of the object signal for each time with which the wavelet scalogram indicates a maximum at the each time.

4. A computer readable medium storing a signal waveform analysis computer program comprising:
   computer program code for determining a trend component of an object signal;
   computer program code for determining an oscillatory component of the object signal by removing the trend component from the object signal;
   computer program code for determining a wavelet scalogram by performing a wavelet analysis on the oscillatory component; and
   computer program code for determining an oscillation period of the object signal with which the wavelet scalogram indicates a maximum.

5. The computer readable medium as claimed in claim 4, wherein the computer program code for determining a trend component of an object signal is implemented by one of computer program code for applying a zero-phase filter to the object signal and computer program code for approximating the object signal with an exponential function expression.

6. The computer readable medium as claimed in claim 4, wherein the computer program code for determining an oscillation period of the object signal is implemented by computer program code for determining an oscillation period of the object signal for each time with which the wavelet scalogram indicates a maximum at the each time.

7. A vehicle dynamic characteristic analysis method comprising:
   determining a trend component of an object signal;
   determining an oscillatory component of the object signal by removing the trend component from the object signal;
   determining a wavelet scalogram by performing a wavelet analysis on the oscillatory component;
   determining a dominant oscillation period as a scale parameter for each time with which the wavelet scalogram indicates a maximum at the each time;
   determining in accordance with the dominant oscillation period a time when the object signal is maximum; and
   determining a maximum and a minimum of the object signal within the dominant oscillation period.

8. The vehicle dynamic characteristic analysis method as claimed in claim 7, wherein the determining a trend component of an object signal is implemented by one of applying a zero-phase filter to the object signal and approximating the object signal with an exponential function expression.

9. The vehicle dynamic characteristic analysis method as claimed in claim 7, further comprising applying a zero-phase filter to the object signal before the determining a trend component of an object signal.

10. The vehicle dynamic characteristic analysis method as claimed in claim 7,
   wherein the determining a dominant oscillation period is implemented by determining a dominant oscillation period as a scale parameter for each time with which the wavelet scalogram indicates a maximum at the each time with a band limitation on scale parameter, and
   wherein the determining a maximum and a minimum of the object signal comprises:
      determining a complex signal waveform by performing a wavelet inverse transformation of the wavelet scalogram;
      extracting a real part from the complex signal waveform; and
      determining a maximum and a minimum of the object signal within the dominant oscillation period in accordance with the real part.

11. A vehicle dynamic characteristic analysis method comprising:
   determining a trend component of an object signal;
   determining an oscillatory component of the object signal by removing the trend component from the object signal;
   determining a wavelet scalogram by performing a wavelet analysis on the oscillatory component with a band limitation on scale parameter;
   determining a complex signal waveform by performing a wavelet inverse transformation of the wavelet scalogram; and
   obtaining a signal waveform envelope by determining the absolute value of the complex signal waveform.

12. A vehicle dynamic characteristic analysis method comprising:
   determining a trend component of an object signal;
   determining an oscillatory component of the object signal by removing the trend component from the object signal;
   determining a wavelet scalogram by performing a wavelet analysis on the oscillatory component;
   processing the wavelet scalogram with a filter having a frequency-gain characteristic at each time;
   determining a complex signal waveform by performing a wavelet inverse transformation of the wavelet scalogram; and
   obtaining the magnitude of a component emphasized by the filter by determining the absolute value of the complex signal waveform.

13. The vehicle dynamic characteristic analysis method as claimed in claim 12, further comprising determining a signal waveform of the emphasized component by extracting a real part from the complex signal waveform.

14. A vehicle dynamic characteristic analysis method comprising:
   determining a trend component of an object signal;
   determining an oscillatory component of the object signal by removing the trend component from the object signal;
   determining a wavelet scalogram by performing a wavelet analysis on the oscillatory component;
   determining a dominant oscillation period of the object signal at a trigger time;
   determining an average of the object signal in accordance with the dominant oscillation period at the trigger time.

15. The vehicle dynamic characteristic analysis method as claimed in claim 14, wherein the determining an average of the object signal comprises:
   determining a first average and a standard deviation of the object signal in accordance with the dominant oscillation period at the trigger time; and
   determining a second average of the object signal before change in accordance with the first average and the standard deviation.

16. A computer readable medium storing a vehicle dynamic characteristic analysis computer program comprising:
   computer program code for determining a trend component of an object signal;
   computer program code for determining an oscillatory component of the object signal by removing the trend component from the object signal;

computer program code for determining a wavelet scalogram by performing a wavelet analysis on the oscillatory component;

computer program code for determining a dominant oscillation period as a scale parameter for each time with which the wavelet scalogram indicates a maximum at the each time;

computer program code for determining in accordance with the dominant oscillation period a time when the object signal is maximum; and computer program code for determining a maximum and a minimum of the object signal within the dominant oscillation period.

17. The computer readable medium as claimed in claim 16, wherein the computer program code for determining a trend component of an object signal is implemented by one of computer program code for applying a zero-phase filter to the object signal and computer program code for approximating the object signal with an exponential function expression.

18. The computer readable medium as claimed in claim 16, wherein the vehicle dynamic characteristic analysis computer program further comprises computer program code for applying a zero-phase filter to the object signal before the determining a trend component of an object signal.

19. The computer readable medium as claimed in claim 16,
wherein the computer program code for determining a dominant oscillation period is implemented by computer program code for determining a dominant oscillation period as a scale parameter for each time with which the wavelet scalogram indicates a maximum at the each time with a band limitation on scale parameter, and wherein the computer program code for determining a maximum and a minimum of the object signal comprises:

computer program code for determining a complex signal waveform by performing a wavelet inverse transformation of the wavelet scalogram;

computer program code for extracting a real part from the complex signal waveform; and computer program code for determining a maximum and a minimum of the object signal within the dominant oscillation period in accordance with the real part.

20. A computer readable medium storing a vehicle dynamic characteristic analysis computer program comprising:

computer program code for determining a trend component of an object signal;

computer program code for determining an oscillatory component of the object signal by removing the trend component from the object signal;

computer program code for determining a wavelet scalogram by performing a wavelet analysis on the oscillatory component with a band limitation on scale parameter;

computer program code for determining a complex signal waveform by performing a wavelet inverse transformation of the wavelet scalogram; and computer program code for obtaining a signal waveform envelope by determining the absolute value of the complex signal waveform.

21. A computer readable medium storing a vehicle dynamic characteristic analysis computer program comprising:

computer program code for determining a trend component of an object signal;

computer program code for determining an oscillatory component of the object signal by removing the trend component from the object signal;

computer program code for determining a wavelet scalogram by performing a wavelet analysis on the oscillatory component;

computer program code for processing the wavelet scalogram with a filter having a frequency-gain characteristic at each time;

computer program code for determining a complex signal waveform by performing a wavelet inverse transformation of the wavelet scalogram; and computer program code for obtaining the magnitude of a component emphasized by the filter by determining the absolute value of the complex signal waveform.

22. A computer readable medium storing a vehicle dynamic characteristic analysis computer program comprising:

computer program code for determining a trend component of an object signal;

computer program code for determining an oscillatory component of the object signal by removing the trend component from the object signal;

computer program code for determining a wavelet scalogram by performing a wavelet analysis on the oscillatory component;

computer program code for processing the wavelet scalogram with a filter having a frequency-gain characteristic at each time;

computer program code for determining a complex signal waveform by performing a wavelet inverse transformation of the wavelet scalogram; and computer program code for determining a signal waveform of the emphasized component by extracting a real part from the complex signal waveform.

23. A computer readable medium storing a vehicle dynamic characteristic analysis computer program comprising:

computer program code for determining a trend component of an object signal;

computer program code for determining an oscillatory component of the object signal by removing the trend component from the object signal;

computer program code for determining a wavelet scalogram by performing a wavelet analysis on the oscillatory component;

computer program code for determining a dominant oscillation period of the object signal at a trigger time; and computer program code for determining an average of the object signal in accordance with the dominant oscillation period at the trigger time.

24. The computer readable medium as claimed in claim 23, wherein the computer program code for determining an average of the object signal comprises:

computer program code for determining a first average and a standard deviation of the object signal in accordance with the dominant oscillation period at the trigger time; and computer program code for determining a second average of the object signal before change in accordance with the first average and the standard deviation.

* * * * *